US012737689B2

(12) United States Patent
Du et al.

(10) Patent No.: US 12,737,689 B2
(45) Date of Patent: Sep. 15, 2026

(54) SCALE-PERMUTED MACHINE LEARNING ARCHITECTURE

(71) Applicant: Google LLC, Mountain View, CA (US)

(72) Inventors: Xianzhi Du, San Jose, CA (US); Yin Cui, Mountain View, CA (US); Tsung-Yi Lin, Sunnyvale, CA (US); Quoc V. Le, Sunnyvale, CA (US); Pengchong Jin, Mountain View, CA (US); Mingxing Tan, Newark, CA (US); Golnaz Ghiasi, Mountain View, CA (US); Xiaodan Song, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 215 days.

(21) Appl. No.: 18/784,068

(22) Filed: Jul. 25, 2024

(65) Prior Publication Data

US 2024/0378509 A1 Nov. 14, 2024

Related U.S. Application Data

(62) Division of application No. 17/061,355, filed on Oct. 1, 2020, now Pat. No. 12,079,695.

(51) Int. Cl.

*G06N 20/00* (2019.01)
*G06F 11/34* (2006.01)
*G06N 3/04* (2023.01)

(52) U.S. Cl.

CPC ......... *G06N 20/00* (2019.01); *G06F 11/3495* (2013.01); *G06N 3/04* (2013.01)

(58) Field of Classification Search

CPC ....... G06N 20/00; G06N 3/04; G06F 11/3495
See application file for complete search history.

(56) References Cited

U.S. PATENT DOCUMENTS

| | | | | |
|---|---|---|---|---|
| 11,748,615 B1 * | 9/2023 | Wu | G06N 3/08 706/25 |
| 2017/0360401 A1 | 12/2017 | Rothberg et al. | |

(Continued)

OTHER PUBLICATIONS

Liu et al. Auto-DeepLab: Hierarchical Neural Architecture Search for Semantic Image Segmentation. 2019 (Year: 2019).*

(Continued)

*Primary Examiner* — Michelle T Bechtold
*Assistant Examiner* — Robert Bejcek, II
(74) *Attorney, Agent, or Firm* — DORITY & MANNING, P.A.

(57) ABSTRACT

A computer-implemented method of generating scale-permuted models can generate models having improved accuracy and reduced evaluation computational requirements. The method can include defining, by a computing system including one or more computing devices, a search space including a plurality of candidate permutations of a plurality of candidate feature blocks, each of the plurality of candidate feature blocks having a respective scale. The method can include performing, by the computing system, a plurality of search iterations by a search algorithm to select a scale-permuted model from the search space, the scale-permuted model based at least in part on a candidate permutation of the plurality of candidate permutations.

20 Claims, 11 Drawing Sheets

(56) References Cited

U.S. PATENT DOCUMENTS

| | | | |
|---|---|---|---|
| 2020/0167586 | A1 | 5/2020 | Gao et al. |
| 2020/0401871 | A1 | 12/2020 | Tseng |
| 2021/0019151 | A1 | 1/2021 | Pudipeddi et al. |

OTHER PUBLICATIONS

Chen et al., "Detnas: Backbone Search for Object Detection", 2019 Conference on Neural Information Processing Systems, Vancouver, Canada, Dec. 8-14, 2019, 11 pages.
Chen et al., "Encoder-Decoder with Atrous Separable Convolution for Semantic Image Segmentation", arXiv:1802.02611v3, Aug. 22, 2018, 18 pages.
Chollet., "Xception: Deep Learning with Depthwise Separable Convolutions", 2009 Institute of Electrical and Electronics Engineers Conference on Computer Vision and Pattern Recognition, Honolulu, Hawaii, United States, Jul. 21-26, 2017, pp. 1251-1258.
Deng et al., "ImageNet: A Large-Scale Hierarchical Image Database", 2009 Institute of Electrical and Electronics Engineers Conference on Computer Vision and Pattern Recognition, Miami Beach, Florida, United States, Jun. 20-25, 2009, 9 pages.
Elsken et al. "Neural Architecture Search: A Survey", Journal of Machine Learning Research, vol. 20, 2019, 21 pages.
Ghiasi et al., "DropBlock: A Regularization Method for Convolutional Networks", Thirty-Second International Conference on Neural Information Processing Systems, Montreal, Canada, Dec. 3-8, 2018, 11 pages.
Ghiasi et al., "NAS-FPN: Learning Scalable Feature Pyramid Architecture for Object Detection", 2019 IEEE/CVF Conference on Computer Vision and Pattern Recognition, Jun. 16-20, 2019, Long Beach, California, United States, pp. 7036-7045.
Ghosh et al., "Supervised Dimensionality Reduction and Visualization using Centroid-Encoder", Journal of Machine Learning Research, vol. 23, No. 20, 2022, 34 pages.
Goyal et al., "Accurate, Large Minibatch SGD: Training ImageNet in 1 Hour", arXiv:1706.02677v1, Jun. 8, 2017, 12 pages.
He et al., "Bag of Tricks for Image Classification with Convolutional Neural Networks", 2019 IEEE/CVF Conference on Computer Vision and Pattern Recognition, Long beach, California, United States, Jun. 16-20, 2019, pp. 558-567.
He et al., "Deep Residual Leaming for Image Recognition", 2016 Institute of Electrical and Electronics Engineers Conference on Computer Vision and Pattern Recognition, Las Vegas, Nevada, United States, Jun. 26-Jul. 1, 2016, pp. 770-778.
He et al., "Mask R-CNN", 2017 Institute of Electrical and Electronics Engineers International Conference on Computer Vision, Venice, Italy, Oct. 22-29, 2017, pp. 2961-2969.
He et al., "Rethinking ImageNet Pre-training", 2019 IEEE/CVF International Conference on Computer Vision, Seoul, South Korea, Oct. 27-Nov. 2, 2019, pp. 4918-4927.
Howard et al., "Searching for MobileNetV3", 2019 IEEE/CVF International Conference on Computer Vision, Seoul, South Korea, Oct. 27-Nov. 2, 2019, pp. 1314-1324.
Hu et al., "Squeeze-and-Excitation Networks", 2018 IEEE/CVF Conference on Computer Vision and Pattern Recognition, Salt Lake City, Utah, United States, Jun. 18-22, 2018, pp. 7132-7141.
Huang et al., "Deep Networks with Stochastic Depth", arXiv:1603.09382v3, Jul. 16, 2016, 16 pages.
Huang et al., "Densely Connected Convolutional Networks", 2017 Institute of Electrical and Electronics Engineers Conference on Computer Vision and Pattern Recognition, Honolulu, Hawaii, United States, Jul. 21-26, 2017, pp. 4700-4708.
Huang et al., "GPipe: Efficient Training of Giant Neural Networks using Pipeline Parallelism", arXiv:1811.06965v4, Dec. 12, 2018, 11 pages.
Huang et al.. "Speed/Accuracy Trade-offs for Modern Convolutional Object Detectors", 2017 Institute of Electrical and Electronics Engineers Conference on Computer Vision and Pattern Recognition, Honolulu, Hawaii, United States, Jul. 21-26, 2017, pp. 7310-7319.
Krizhevsky et al., "ImageNet Classification with Deep Convolutional Neural Networks", Twenty-Sixth Annual Conference on Neural Information Processing Systems, Lake Tahoe, Nevada, United States, Dec. 3-8, 2012, 9 pages.
Lecun et al., "Backpropagation Applied to Handwritten Zip Code Recognition", Neural Computation, vol. 1, No. 4, Dec. 1989, pp. 541-551.
Li et al., "DetNet: Design Backbone for Object Detection", 2018 European Conference on Computer Vision, Munich, Germany, Sep. 8-14, 2018, 17 pages.
Lin et al., "Feature Pyramid Networks for Object Detection", 2017 Institute of Electrical and Electronics Engineers Conference on Computer Vision and Pattern Recognition, Honolulu, Hawaii, United States, Jul. 21-26, 2017, pp. 2117-2125.
Lin et al., "Focal Loss for Dense Object Detection", 2017 Institute of Electrical and Electronics Engineers International Conference on Computer Vision, Venice, Italy, Oct. 22-29, 2017, pp. 2980-2988.
Lin et al., "Microsoft COCO: Common Objects in Context", arXiv:1405.0312v2, Jul. 5, 2014, 14 pages.
Liu et al., "Auto-DeepLab: Hierarchical Neural Architecture Search for Semantic Image Segmentation", 2019 IEEE/CVF Conference on Computer Vision and Pattern Recognition, Long Beach, California, United States, Jun. 15-20, 2019, pp. 82-92.
Liu et al., "Darts: Differentiable Architecture Search", Seventh International Conference on Learning Representations, New Orleans, Louisiana, United States, May 6-9, 2019, 13 pages.
Liu et al., "Progressive Neural Architecture Search", Fifteenth European Conference on Computer Vision, Munich, Germany, Sep. Aug. 14, 2018, 16 pages.
Medium, "Deep Belief Networks—All you Need to Know", Aug. 1, 2018, https://icecreamlabs.medium.com/deep-belief-networks-all-you-need-to-know-68aa9a71cc53,on Apr. 2, 2025, 8 pages.
Medium, "Deep Learning-Deep Belief Network (DBN)", Dec. 12, 2018, https://medium.datadriveninvestor.com/deep-learning-deep-belief-network-dbn-ab715b5b8afc, retrieved on Apr. 2, 2025, 7 pages.
Medium, "Everything you Need to Know About AutoML and Neural Architecture Search", Aug. 21, 2018, https://towardsdatascience.com/everything-you-need-to-know-about-automl-and-neural-architecture-search-8db1863682bf, retrieved on Sep. 30, 2022, 8 pages.
Newell et al., "Stacked Hourglass Networks for Human Pose Estimation", Fourteenth European Conference on Computer Vision, Amsterdam, The Netherlands, Oct. 8-16, 2016, pp. 483-499.
Ramachandran et al., "Searching for Activation Functions", arXiv:1710.05941v2, Oct. 27, 2017, 13 pages.
Real et al., "Regularized Evolution for Image Classifier Architecture Search", Thirty-Third Association for the Advancement of Artificial Intelligence Conference on Artificial Intelligence, Honolulu, Hawaii, United States, Jan. 27-Feb. 1, 2019, pp. 4780-4789.
Redmon et al., "YOLOv3: An Incremental Improvement", arXiv:1804.02767v1, Apr. 8, 2018, 6 pages.
Russakovsky et al., "ImageNet Large Scale Visual Recognition Challenge", International Journal of Computer Vision, vol. 115, Dec. 1, 2015, pp. 211-252.
Sandler et al., "Mobilenetv2: Inverted Residuals and Linear Bottlenecks", 2018 IEEE/CVF Conference on Computer Vision and Pattern Recognition, Salt Lake City, Utah, United States, Jun. 18-23, 2018, pp. 4510-4520.
Sonoda et al., "Transport Analysis of Infinitely Deep Neural Network", Journal of Machine Learning Research, vol. 20, 2019, 52 pages.
Sun et al., "FishNet: A Versatile Backbone for Image, Region, and Pixel Level Prediction", Thirthy-Second International Conference on Neural Information Processing Systems, Montreal, Canada, Dec. 3-8, 2018, 11 pages.
Szegedy et al., "Going Deeper with Convolutions", 2015 Institute of Electrical and Electronics Engineers Conference on Computer Vision and Pattern Recognition, Boston, Massachusetts, United States, Jun. 7-12, 2015, 9 pages.

(56) References Cited

OTHER PUBLICATIONS

Szegedy et al., "Inception-v4, Inception-ResNet and the Impact of Residual Connections on Learning", Thirty-First Association for the Advancement of Artificial Intelligence Conference on Artificial Intelligence, San Francisco, California, United States, Feb. 4-9, 2017, pp. 4278-4284.
Szegedy et al., "Rethinking the Inception Architecture for Computer Vision", arXiv:1512.00567v3, Dec. 11, 2015, 10 pages.
Tan et al., "EfficientNet: Rethinking Model Scaling for Convolutional Neural Networks", arXiv:1905.11946v3, Nov. 23, 2019, 10 pages.
Tan et al., "MnasNet: Platform-Aware Neural Architecture Search for Mobile", 2019 IEEE/CVF Conference on Computer Vision and Pattern Recognition, Long Beach, California, United States, Jun. 15-20, 2019, pp. 2820-2828.
Van Horn et al., "The iNaturalist Species Classification and Detection Dataset", 2018 IEEE/CVF Conference on Computer Vision and Pattern Recognition, Salt Lake City, Utah, United States, Jun. 18-23, 2018, pp. 8769-8778.
Wang et al., "Deep High-Resolution Representation Learning for Visual Recognition", arXiv:1908.07919v2, Mar. 13, 2020, 23 pages.
Xie et al., "Exploring Randomly Wired Neural Networks for Image Recognition", arXiv:1904.01569v2, Apr. 8, 2019, 10 pages.
Xu et al., "Auto-FPN: Automatic Network Architecture Adaptation for Object Detection Beyond Classification", 2019 IEEE/CVF International Conference on Computer Vision, Oct. 27- Nov. 2, 2019, Seoul, South Korea, pp. 6649-6658.
Zagoruyko et al., "Wide Residual Networks", 2016 British Machine Vision Conference, York, United Kingdom, Sep. 19-22, 2016, 12 pages.
Zoph et al., "Learning Transferable Architectures for Scalable Image Recognition", arXiv:1707.07012v4, Apr. 11, 2018, 14 pages.
Zoph et al., "Neural Architecture Search with Reinforcement Learning", Fifth International Conference on Learning Representations, Toulon, France, Apr. 24-26, 2017, 16 pages.

* cited by examiner

200
Scale-Permuted Model
202
Scale-Permuted Backbone Model
210
204
Task-Specific Combination Model
206
Input Data
208
Scale-Permuted Model Output Data
300
Scale-Permuted Backbone Model
302
Scale-Decreasing Stem Network
308
304
Scale-Permuted Network
206
Input Data
306
Backbone Model Output Data

SCALE-PERMUTED MACHINE LEARNING ARCHITECTURE

PRIORITY

The present application is a divisional of U.S. application Ser. No. 17/061,355, which was filed Oct. 1, 2020, and is hereby incorporated by reference herein in its entirety.

FIELD

The present disclosure relates generally to machine-learning. More particularly, the present disclosure relates to a scale-permuted machine learning architecture, such as a meta-architecture.

BACKGROUND

Certain existing convolutional neural networks can encode an input image into a series of intermediate features with decreasing resolutions. While this structure is suited to classification tasks, it is less well suited for tasks requiring simultaneous recognition and localization (e.g., object detection). Encoder-decoder networks attempt to solve this problem by encoding the input image with an encoder (commonly called a backbone) model and decoding the output from the encoder by a decoder (or detector) model.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method of generating scale-permuted models having improved accuracy and reduced evaluation computational requirements. The method can include defining, by a computing system including one or more computing devices, a search space including a plurality of candidate permutations of a plurality of candidate feature blocks, each of the plurality of candidate feature blocks having a respective scale. The method can include performing, by the computing system, a plurality of search iterations by a search algorithm to select a scale-permuted model from the search space, the scale-permuted model based at least in part on a candidate permutation of the plurality of candidate permutations.

Another example aspect of the present disclosure is directed to a computing system. The computing system can include a machine-learned scale-permuted model, the machine-learned scale-permuted model including a scale-permuted network, the scale-permuted network including a plurality of feature blocks arranged in a scale-permuted sequence such that a scale of the plurality of feature blocks varies nonmonotonically throughout the scale-permuted sequence. The computing system can include one or more processors and one or more memory devices storing computer-readable instructions that, when implemented, cause the one or more processors to perform operations. The operations can include obtaining input data including an input tensor. The operations can include providing the input data to the machine-learned scale-permuted model. The operations can include receiving, as output from the machine-learned scale-permuted model, output data.

Another example aspect of the present disclosure is directed to a computer-implemented method of generating scale-permuted models having improved accuracy and reduced evaluation computational requirements. The method can include receiving, at a computing system including one or more computing devices, a plurality of candidate feature blocks from a user, each of the plurality of candidate feature blocks having a respective scale. The method can include defining, by the computing system, a search space including a plurality of candidate permutations of the plurality of candidate feature blocks. The method can include performing, by the computing system, a plurality of search iterations by a search algorithm to select a scale-permuted model from the search space, the scale-permuted model based at least in part on a candidate permutation of the plurality of candidate permutations. Performing each of the plurality of search iterations can include determining, by the computing system, a candidate scale-permuted model from the search space, the candidate scale-permuted model including a plurality of permuted feature blocks based at least in part on the candidate permutation, and evaluating, by the computing system, the candidate scale-permuted model based at least in part on a performance estimation strategy to obtain an evaluation of the candidate scale-permuted model. The scale-permuted model is selected based at least in part on the evaluations of the candidate scale-permuted model for each of the plurality of search iterations. The method can include providing, by the computing system, the scale-permuted model to the user.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
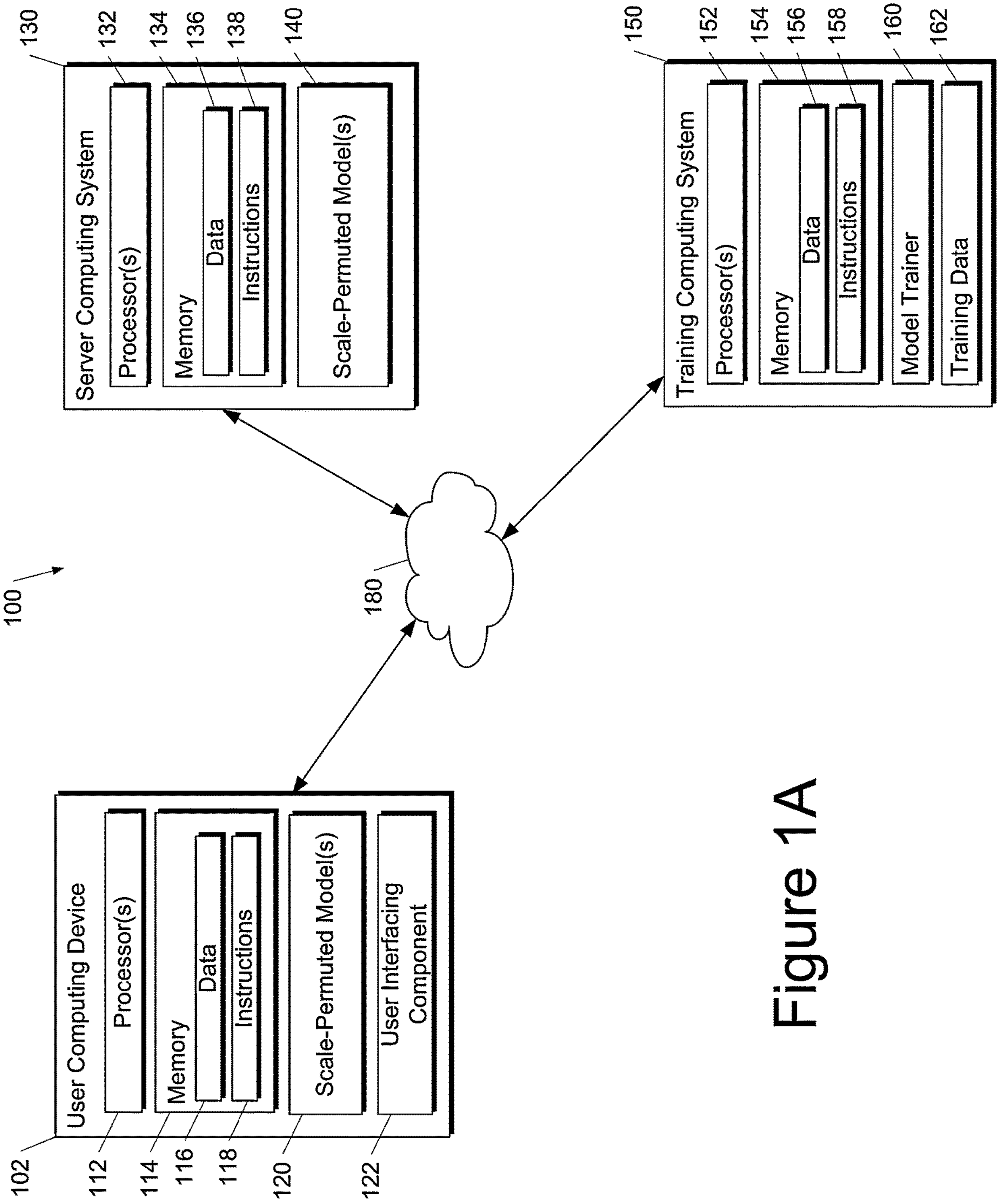
FIG. 1A depicts a block diagram of an example computing system that performs tasks using scale-permuted model(s) according to example embodiments of the present disclosure.

Reference numerals that are repeated across plural figures are intended to identify the same features in various implementations.

DETAILED DESCRIPTION

Generally, the present disclosure is directed to scale-permuted machine-learned models, such as scale-permuted backbone models. The scale-permuted models can include a plurality of feature blocks, where scale of the feature blocks can vary nonmonotonically throughout the sequence, such as by increasing and/or decreasing from one feature block to another in the sequence. In some cases, an ordering of the feature blocks, connections of the feature blocks, and/or various other adjustments can be determined from a search space by a search algorithm, such as Neural Architecture Search (NAS). The search space can include valid permutations of a set of candidate feature blocks, such as feature blocks specified based at least in part on a comparable scale-decreasing architecture (e.g., a ResNet-FPN architecture). Additionally and/or alternatively, the search space can include a plurality of candidate cross-block connections between the feature blocks. The cross-block connections can, in some cases, be cross-scale connections that span feature blocks having different scales. Furthermore, in some embodiments, the search space can further define feature block adjustments for some or all candidate feature blocks, such as adjustments to type and/or scale of feature blocks. The search algorithm can search the search space to select a viable (e.g., optimal, near-optimal, or otherwise relatively best performing) scale-permuted model from a plurality of candidate models defined by the search space. The scale-permuted model can be produced and/or used for a variety of tasks, such as for object detection and/or object classification, segmentation, etc.

Certain existing convolutional neural networks, such as for image processing tasks, can encode an input image into a sequence of intermediate features that capture the semantics of an image (e.g., from local to global), where each subsequent feature block has a lower spatial dimension. For example, many models, such as for image processing tasks, encode input data (e.g., an image) into monotonically decreasing resolutions. Such an arrangement is termed scale-decreased or scale-decreasing. However, in some cases, a scale-decreased model may not be able to deliver strong features for multi-scale visual recognition tasks, such as in cases where recognition and localization are both important (e.g., object detection and/or segmentation). For example, many scale-decreased models operate under the principle that high resolution may be necessary for detecting presence of a feature, and that it may not be necessary to recognize a high-precision location of the feature. For these cases, some existing solutions to improve localization accuracy include a multi-scale encoder-decoder architecture used to address this issue, where a scale-decreased network (e.g., a ResNet) is taken as the encoder, which is referred to as a backbone model. A decoder model, such as a decoder network, is then applied to the backbone to recover the spatial information. As one example, the decoder model may include various cross-scale combinations of the backbone model to generate multi-scale feature maps. While this architecture can be beneficial in some cases, it still relies on a scale-decreased backbone that intuitively removes spatial information by down-sampling, which the decoder then must attempt to recover. Thus, a backbone model can ideally avoid total loss of spatial information inherent to a scale-decreased backbone to provide improved performance in many tasks, such as for tasks where spatial information and resolution/recognition are both desirable, such as object detection, segmentation, etc.

Example aspects of the present disclosure are directed to a scale-permuted model (e.g., a scale-permuted backbone model) that can provide improved performance for machine-learning tasks, such as image processing tasks. The scale-permuted model can include a sequence of feature blocks (e.g., feature maps). In some embodiments, the feature block(s) can include components (e.g., layers) of a feature block such as convolutional layers, activation function layers, etc. For example, the feature block(s) can include convolutional layer(s) that convolve by multiplication, dot product, or other similar combinatorial function, activation functions (e.g., a RELU layer), pooling layers, fully connected layers, normalization layers, etc. As one example, the feature block(s) can include one or more weight layers, an activation function layer, and/or a pooling layer.

Each feature block (e.g., feature map) can have a scale defining a size of the feature block (e.g., a number of nodes and/or a number dimensions, such as in a feature map). For instance, the scale of a feature block can be or can include a width of the feature block and/or a resolution of the feature block. As another example, the scale of a feature block can be a feature level that defines resolution, width, and/or other qualities of the feature block. The width of the feature block can refer to a number of neurons in the feature block. The resolution of the feature block refers to a width and/or height of input data, such as an input image. For instance, the resolution of the feature block can correspond to one or more dimensions of a feature map. Additionally, depth of a network can refer to a number of feature blocks in the network. Generally, increased width allows a feature block to learn fine-grained features having small dimensions. Additionally, increased resolution can provide for improved detail of convolved input data. Multi-scale features that are present in multiple feature blocks having varying scales can serve as strong indications of the features.

According to example aspects of the present disclosure, a scale of each feature block in the sequence can vary nonmonotonically throughout the sequence to form a scale-permuted sequence. For example, a scale may increase between a first feature block and a second feature block in the sequence and decrease between the second feature block and a third feature block subsequent to the first feature block and the second feature block in the sequence. As another example, a scale may decrease between a first feature block and a second feature block in the sequence and increase between the second feature block and a third feature block subsequent to the first feature block and the second feature block in the sequence. In this way, the scale-permuted model can provide for improved retention of spatial information as input data passes through the network, such as, for example, compared to scale-decreased networks. For example, feature blocks in a scale-permuted network can have improved spatial information retention compared to a feature block having equal depth in a scale-decreasing network. This can allow for networks with greater depth to be utilized while retaining spatial information.

As one example, the scale that varies nonmonotonically through a sequence of feature blocks in the scale-permuted model can be a feature level. For instance, a scale-permuted model can be formed of a plurality of feature blocks. Each of the plurality of feature blocks can have an associated feature level. The feature level can be related to a dimension, depth, or other quality of the feature block. As one example, a feature block can have a resolution that is $\frac{1}{2^l}$ of an input resolution, where l is the feature level. In some embodiments, feature blocks having a same feature level can additionally have a same architecture. An input block can include one or more convolutional layers that convolve an input tensor (e.g., an image) to a feature map.

Additionally and/or alternatively, cross-block connections in the scale-permuted network can be established between any suitable feature blocks in the network. For example, cross-block connections can be established from a block having lower ordering to a block having higher ordering. A cross-block connection can be established between a parent feature block and a target feature block. The target feature block can be subsequent to the parent feature block in the (e.g., learned) ordering of feature blocks. For instance, a parent feature block may have a lower position in the ordering than a target feature block. As one example, a parent block may be included in a stem network.

Many existing networks can include only scale-decreasing connections between consecutive feature blocks. According to example aspects of the present disclosure, however, one or more cross-block connections (e.g., cross-scale connections) can be established between a feature block and any suitable subsequent feature block(s) in the sequence, including feature blocks with (e.g., subsequently) increased, decreased, and/or equivalent scales. This can provide for multi-scale feature fusion across feature maps from different feature scales. The cross-block connections can additionally and/or alternatively be skip connections that connect nonconsecutive feature blocks.

One challenge in providing cross-block connections relates to resolution and/or feature dimension differences between a parent feature block and a target feature block, between which the cross-block connection is formed. For instance, a cross-block connection can be or can include a resampling connection. The resampling connection can resample output from a parent block to match a scale (e.g., resolution and/or feature dimension) of the target block. As one example, resampling may be necessary to connect blocks having different feature levels.

As one example, let C be a feature dimension, such as a feature dimension of a convolution (e.g., a 3×3 convolution) in a residual and/or bottleneck block. Let $C^{in}$ and $C^{out}$ be input dimension and output dimension of a block, respectively. In some embodiments, such as for a bottleneck block, $C^{in}$ and/or $C^{out}$ can be a multiple of C, such as 4C. Additionally and/or alternatively, such as for a residual block, $C^{in}$ and/or Cold can be equivalent to C. In some embodiments, a scaling factor α can be introduced. The scaling factor can be used to reduce computational cost of resampling. For instance, the output dimension of a parent feature block can be adjusted to αC. In some embodiments, a can have a value between 0 and 1, such as 0.5.

The resampling connection can include (e.g., subsequent to scaling the output of a parent block by the scaling factor) upsampling and/or downsampling the output of the parent block. As one example, upsampling the output of the parent block can include feeding the output of the parent block to an upsampling model, such as a nearest-neighbor interpolation model. The nearest-neighbor interpolation model can produce an output having a higher feature level than the output of the parent block and that approximates a scaled-up version of the output of the parent block. As another example, downsampling the output of the parent block can be performed by convolving the output of the parent block, such as by a stride-2 3×3 convolution. In some embodiments, a stride-2 max pooling can additionally be performed on the convolved output. After upsampling and/or downsampling, a 1×1 convolution may be applied to the output to match the output feature dimension to the input feature dimension of the target block. For example, the output feature dimension may be converted from αC to $C^{in}$ by the 1×1 convolution. Multiple inputs to a target block (e.g., one having a lower parent block feature dimension and/or one having a higher parent block feature dimension) may be merged, such as by elemental addition, then used as input to the target block.

In some embodiments, the scale-permuted model can include a stem network and a scale-permuted network. The stem network and the scale-permuted network can each include a sequence of one or more feature blocks having associated scales (e.g., feature levels). The stem network can be connected between the inputs to the scale-permuted model and the scale-permuted network. For instance, feature blocks in the stem network can be candidate inputs for the following scale-permuted network. For example, the stem network can receive input data (e.g., an image) and provide one or more outputs (e.g., feature maps) as inputs to the scale-permuted network. The stem network can be a scale-decreasing stem network. For instance, scale (e.g., feature level) of the stem network can vary monotonically throughout the sequence of the stem network. Additionally, scale (e.g., feature level) of the scale-permuted network can vary nonmonotonically throughout the sequence of the scale-permuted network. In this way, the stem network can form a scale-decreasing network that provides inputs to some or all blocks of the scale-permuted network. In some embodiments, the stem network and the scale-permuted network can be generated from the search space. In some embodiments, the stem network may be omitted such that the entirety of the scale-permuted network has a nonmonotonically varying scale. The blocks of the scale-permuted network may be referred to as intermediate feature blocks and/or output feature blocks. The output feature blocks can include output connections that define an output of the scale-permuted network. The intermediate feature blocks can include no output connections.

Additionally and/or alternatively, output connections of the scale-permuted model can be taken from any suitable feature block in the network. For example, the scale-permuted model can be directly connected to a task-specific model, such as a classification and/or bounding box regression subnet. For instance, this can provide for model output without requiring a separate decoder or detector network, such as a feature pyramid network. However, in some embodiments, the scale-permuted model can be used as a backbone model with an existing detector model.

In some embodiments, the scale-permuted model can be learned by a search algorithm, such as Neural Architecture Search (NAS). Neural Architecture Search is a technique for automatic design of neural networks. For instance, according to Neural Architecture Search, a search space can be defined that includes a plurality of candidate models, such as models according to rules, heuristics, etc. A search strategy can also be defined that provides an approach to explore the search space (e.g., how to form each candidate model). Additionally, a performance estimation strategy can be defined that provides a strategy to evaluate the candidate model, such as how to estimate performance of a candidate model. For instance, NAS can learn architectures in the given search space by optimizing for specified rewards. In some embodiments, the performance estimation strategy may provide estimates without requiring constructing and/or training each candidate model, which may be an intensive task. Example aspects of the present disclosure relate especially to defining a search space for Neural Architecture Search that can provide for generation of scale-permuted models according to example aspects of the present disclosure. For instance, according to example aspects of the present disclosure, any suitable search strategy and/or performance estimation strategy can be employed. As one example, the model architecture can be learned by NAS on any suitable task, such as for an object recognition task. Additionally and/or alternatively, in some embodiments, another suitable search algorithm may be employed and/or the models may be at least partially manually designed.

In some embodiments, the feature blocks in the scale-permuted model can be permuted from an existing model according to an existing architecture specifying a plurality of candidate feature blocks, such as a scale-decreasing architecture, such as a ResNet architecture. The existing architecture can have comparable depth to the desired scale-permuted model. In some embodiments, depth of the scale-permuted model can be scaled up to higher layer architectures by repeating feature blocks (e.g., two, three, four, etc.) times and/or increasing the feature dimension correspondingly.

As one example, a search space can be established including some or all permutations of candidate feature blocks from an existing model, such as bottleneck feature blocks from a ResNet model. For instance, a scale-permuted model can be selected by learning a permutation of candidate feature blocks and subsequently learning cross-block connections between feature blocks within the desired permutation. In some embodiments, the search space can define a maximum number of input connections and/or output connections for each candidate feature block, such as, for example, two connections. The search space may include connections between consecutive feature blocks. However, according to example aspects of the present disclosure, in some embodiments, models that do not include connections between each pair of consecutive feature blocks may be learned. In some embodiments, such as in embodiments including a stem network and a scale-permuted network, only the intermediate feature blocks and/or output feature blocks (e.g., not the feature blocks of the stem network) may be permuted.

In some embodiments, the search space can additionally include block adjustments for some or all candidate feature blocks in the search space. In some embodiments, the block adjustments may be evaluated by the search algorithm (e.g., NAS) subsequent to determining the cross-block connections. As one example, the block adjustments can include scale adjustments. For example, the search space may include the capability of adjusting a feature level of each candidate block within a specified limit. As one example, the feature level for a candidate block may be reduced by one, kept equivalent, increased by one, and/or increased by two. Adjusting the feature level of a block may additionally adjust other qualities of the feature block, such as resolution. As another example, a type of the candidate feature blocks may be adjusted. For example, the search space may be defined such that each feature block can be chosen to be one of a plurality of candidate types, such as a residual block and/or a bottleneck block.

Scale-permuted models according to example aspects of the present disclosure can be employed for any suitable machine-learning task. As one example, scale-permuted models according to example aspects of the present disclosure can find particular advantages in feature processing tasks where feature recognition and localization are (e.g., dually) important, such as, for example, feature detection and/or localization, object detection and/or localization, etc. in image data and/or other suitable tensor data having one or more (e.g., two or more) dimensions. For example, a scale-permuted model can receive input data descriptive of image data including one or more features and produce, based on the input data, output data descriptive of location, presence, or other identification of the one or more features. As another example, scale-permuted models according to example aspects of the present disclosure can be employed for classification tasks, such as object classification or recognition. For instance, a scale-permuted model can receive input data descriptive of image data depicting one or more objects and produce, based on the input data, output data descriptive of an object classification for the one or more objects. As another example, the scale-permuted model may be used for segmentation tasks. For example, the scale-permuted model can receive input data descriptive of image data and produce a segmentation output for the image. As examples, the scale-permuted backbone model may be used with character detection and/or recognition (e.g., phone number and/or street number detection), autonomous vehicles (e.g., vehicle and/or pedestrian detection) and/or other suitable applications. The scale-permuted backbone is versatile and has potential to become a unified model architecture for many tasks, such as visual recognition tasks.

For instance, the scale-permuted model can be learned as a backbone model and connected directly to a task-specific combination model. The task-specific combination model can include one or more output connections from the scale-permuted backbone model. Additionally and/or alternatively, the task-specific combination model can include various other layers, such as subnets. As one example, the task-specific combination model can be a classification and/or bounding box regression subnet. This can essentially remove the distinction between backbone and detector networks that is common to some tasks, such as in contrast to feature pyramid networks (e.g., learning feature pyramid networks using NAS). For instance, the scale-permuted backbone model can be similar in use to a feature pyramid network.

One example scale-permuted model according to example aspects of the present disclosure includes five output feature blocks from feature level 3 to level 7. A 1×1 convolution is attached to each output feature block to produce multi-scale features P3 to P7 with the same feature dimension. The rest of the feature blocks in the model are intermediate feature blocks before the output feature blocks. The model is designed by Neural Architecture Search by first searching for scale permutations for the intermediate and output feature blocks, then determining cross-block (e.g., cross-scale) connections between the feature blocks. The model is further improved by adding feature block adjustments in the search space.

As one example, this model can be applied to image classification. The P3 to P7 feature pyramid can be used to construct a classification network. The final feature map is generated by upsampling and averaging the feature maps. For instance, nearest-neighbor upsampling can be used to ensure all feature maps have the same scale as the largest feature map P3. The standard global average pooling on P is applied to produce a 256-dimensional feature vector followed by a linear classifier with softmax for classification.

Additionally and/or alternatively, in some embodiments, the scale-permuted architecture can be learned in tandem with a detector model. As one example, a scale-permuted architecture can be learned with a RetinaNet detector by replacing the default ResNet-FPN backbone model. Furthermore, in some embodiments, the scale-permuted model can use 4 shared convolutional layers at feature dimension 128. Additionally and/or alternatively, the scale-permuted model can use 4 shared convolutional layers at feature dimension 256. Additionally and/or alternatively, the scale-permuted model can scale up subnets by using 7 shared convolutional layers at feature dimension 512. As another example, to employ the scale-permuted architecture in Mask R-CNN, the architecture design can be the same. Furthermore, in some embodiments, the scale-permuted model may use one shared convolutional layer at feature dimension 256 for RPN and/or 4 shared convolutional layers at feature dimension 256 followed by a fully-connected layers of 1024 units for detection branch, and 4 shared convolutional layers at feature dimension 256 for mask branch.

As another example, according to example aspects of the present disclosure, a computing system can include a scale-permuted model produced according to example aspects of the present disclosure. For instance, a computing system can include a machine-learned scale-permuted model including a scale-permuted network. The scale-permuted network can include a plurality of feature blocks arranged in a scale-permuted sequence such that a scale of the plurality of feature blocks varies nonmonotonically throughout the scale-permuted sequence. Additionally and/or alternatively, the scale-permuted network can include one or more processors and one or more memory devices storing computer-readable instructions that, when implemented, cause the one or more processors to perform operations. Additionally and/or alternatively, the one or more memory devices can store data indicative of the scale-permuted model. The operations can include instructions for operating the machine-learned model, such as obtaining input data including an input tensor, providing the input data to the machine-learned scale-permuted model, and receiving, as output from the machine-learned scale-permuted model, output data. In some embodiments, the input data can be or can include image data. Additionally and/or alternatively, the output data can be or can include an object recognition output. In some embodiments, the scale can be a feature level. For instance, a resolution of the plurality of feature blocks can be based at least in part on the feature level. In some embodiments, the plurality of feature blocks can include one or more weight layers, at least one activation function layer, and/or at least one pooling layer.

In some embodiments, the machine-learned scale-permuted model can include one or more cross-scale connections configured to connect a parent block of the plurality of feature blocks, the parent block having a first scale, to a target block of the plurality of feature blocks, the target block having a second scale. In some embodiments, the one or more cross-scale connections can include at least one resampling connection configured to scale an output from the parent block at the first scale to an input of the target block at the second scale. In some embodiments, the resampling connection can include a scaling factor.

In some embodiments, the machine-learned scale-permuted model can include a stem network. The stem network can include a plurality of feature blocks arranged in a scale-decreasing sequence. In some embodiments, the machine-learned scale-permuted model can include a task-specific combination model.

Systems and methods according to example aspects of the present disclosure can provide for a number of technical effects and benefits, including improvements to computing technology. For example, scale-permuted models including nonmonotonic scale can intuitively provide better retention of spatial information as data moves through the model. Additionally and/or alternatively, multiscale features provided by cross-scale connections can provide improved spatial-detail understanding. This can translate to improved performance at tasks such as object classification. For example, scale-permuted models according to example aspects of the present disclosure can have improved accuracy and reduced evaluation computational requirements. Additionally and/or alternatively, including block adjustments in a search space can provide variables that can be tuned to further improve performance, such as by requiring fewer FLOPs to operate the model. Improved performance compared to existing models (e.g., scale-decreasing models, such as ResNet models) having comparable scale (e.g., about a same number of feature blocks) can include reduced computational resources and/or improved accuracy. As one example, some or all candidate models in the search space have roughly the same computation as a comparable ResNet architecture when formed from permutations of the ResNet feature blocks. Including block adjustments can further reduce the required computational resources such as processor usage, memory usage, network bandwidth usage, etc., Additionally and/or alternatively, scale-permuted models and/or cross-block connections can further improve accuracy of the models.

Additionally and/or alternatively, the scale-permuted models can be learned by a search algorithm from a search space according to example embodiments of the present disclosure. The use of a search algorithm (e.g., NAS) can provide for reduced manual and/or computational resources required to design and/or evaluate the scale-permuted models. For instance, including the capability of permuting feature blocks, cross-scale connections, and/or block adjustments can greatly increase variability of the models, which can provide for improved performance but additionally complicate design. The use of a search algorithm such as NAS can provide the capability of designing these scale-permuted models to achieve improved performance without requiring manual evaluation of a potentially vast search space.

With reference now to the Figures, example embodiments of the present disclosure will be discussed in further detail.

FIG. 1A depicts a block diagram of an example computing system 100 that performs tasks utilizing scale-permuted model(s) according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more scale-permuted models 120. For example, the scale-permuted models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example scale-permuted models 120 are discussed with reference to FIGS. 2-6D.

In some implementations, the one or more scale-permuted models 120 can be received from the server computing system 130 over network 180, stored in the user computing device memory 114, and then used or otherwise implemented by the one or more processors 112. In some implementations, the user computing device 102 can implement multiple parallel instances of a single scale-permuted model 120 (e.g., to perform parallel tasks across multiple instances of a scale-permuted model 120).

More particularly, a scale-permuted model 120 may be configured to receive input data, such as an input tensor (e.g., an image). The scale-permuted model 120 may provide the input data through a scale-permuted network including a scale-permuted sequence of feature blocks. Each of the feature blocks may upsample and/or downsample the input data to a feature map. Thus, the input data may be propagated through a scale-permuted network to form a plurality of feature maps. The feature maps may be combined at an output of the scale-permuted model 120 to identify cross-scale features. According to example aspects of the present disclosure, the scale-permuted model may be permuted from a comparable architecture to provide improved performance, as discussed further herein.

Additionally or alternatively, one or more scale-permuted models 140 can be included in or otherwise stored and implemented by the server computing system 130 that communicates with the user computing device 102 according to a client-server relationship. For example, the scale-permuted models 140 can be implemented by the server computing system 140 as a portion of a web service (e.g., a machine learning service, such as a service using one or more machine-learned models to perform at least one suitable computing task, such as an image recognition task). Thus, one or more models 120 can be stored and implemented at the user computing device 102 and/or one or more models 140 can be stored and implemented at the server computing system 130.

The user computing device 102 can also include one or more user interfacing component 122 that receives user input and/or provides output to a user. For example, the user interfacing component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user interfacing components include a microphone, a speaker, a traditional keyboard, or other means by which a user can provide user input and/or receive output.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned scale-permuted models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-6D.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the scale-permuted models 120 and/or 140 based on a set of training data 162. The training data 162 can include, for example, datasets such as the COCO dataset, iNaturalist dataset, etc.

In one example implementation, stochastic gradient descent is used to train on tensor processing unit devices with a set weight decay and momentum. The models are trained from scratch on COCO train2017 with 256 batch size for 250 epochs. The initial learning rate is set to 0.28 and a linear warmup is applied in the first 5 epochs. A stepwise learning rate that decays to 0:1 and 0:01 at the last 30 and 10 epoch is applied. Synchronized batch normalization with 0.99 momentum is applied, followed by ReLU and DropFeature block for regularization. Multi-scale training with a random scale between [0:8; 1:2] is then applied. A base anchor size is set based on model depth, such as being set to 3 for a 96-feature-block or smaller model and 4 for larger models.

Another example training implementation removes DropFeature block and instead applies stronger multi-scale training with a random scale between [0:5; 2:0] for 350 epochs. Stochastic depth is added with keep prob 0.8 for stronger regularization. Furthermore, in some implementations, ReLU is replaced with swish activation to train models for 500 epochs Additionally, this implementation adopts a more aggressive multi-scale training strategy with a random scale between [0.1, 2.0]. When applied to image classification, the models are trained with a batch size of 4096 for 200 epochs. Some example implementations use cosine learning rate decay with linear scaling of learning rate and gradual warmup in the first 5 epochs.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images and/or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
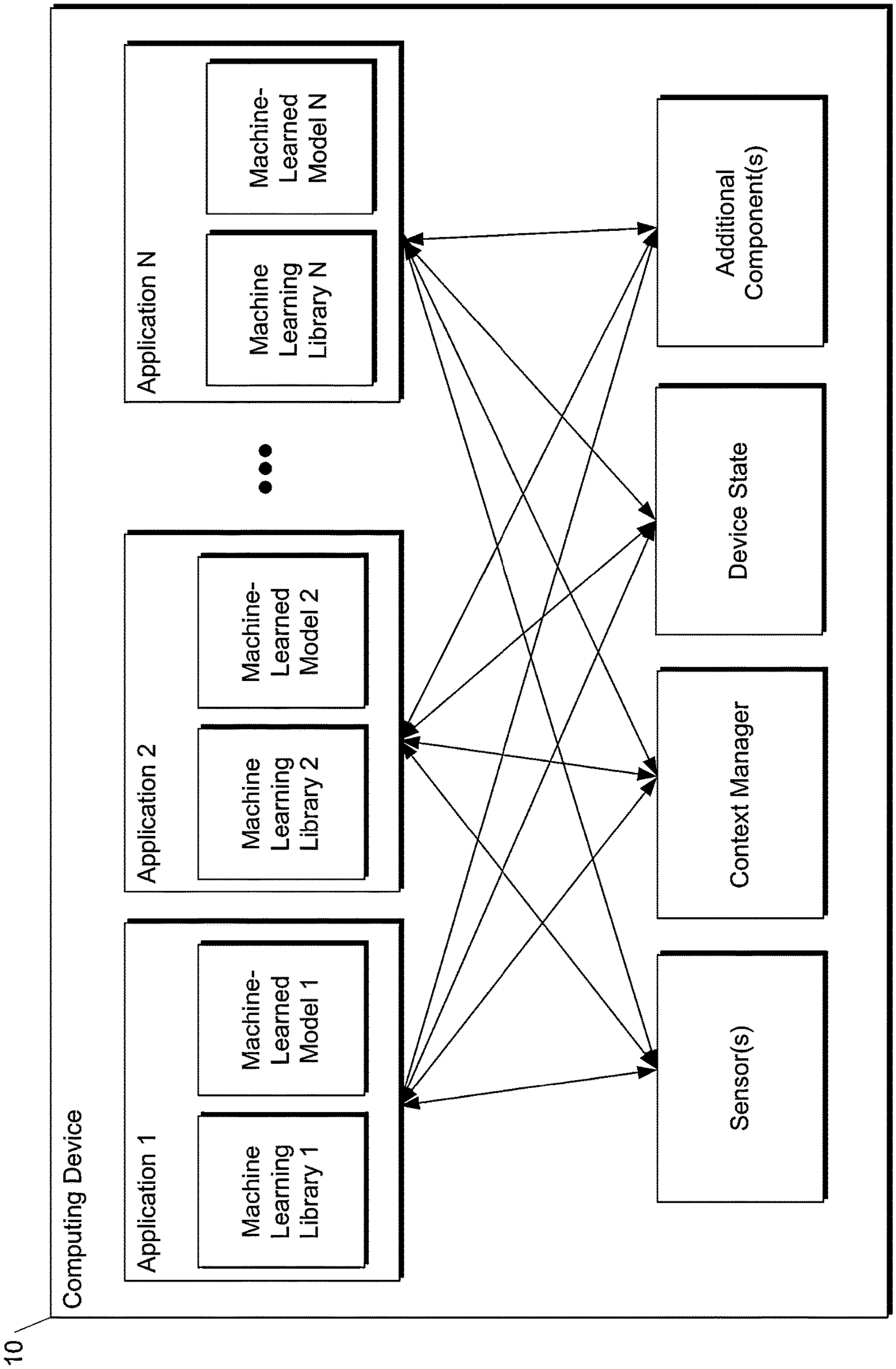
FIG. 1B depicts a block diagram of an example computing device that performs tasks using scale-permuted model(s) according to example embodiments of the present disclosure.

FIG. 1B depicts a block diagram of an example computing device 10 that performs tasks using scale-permuted model(s) according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
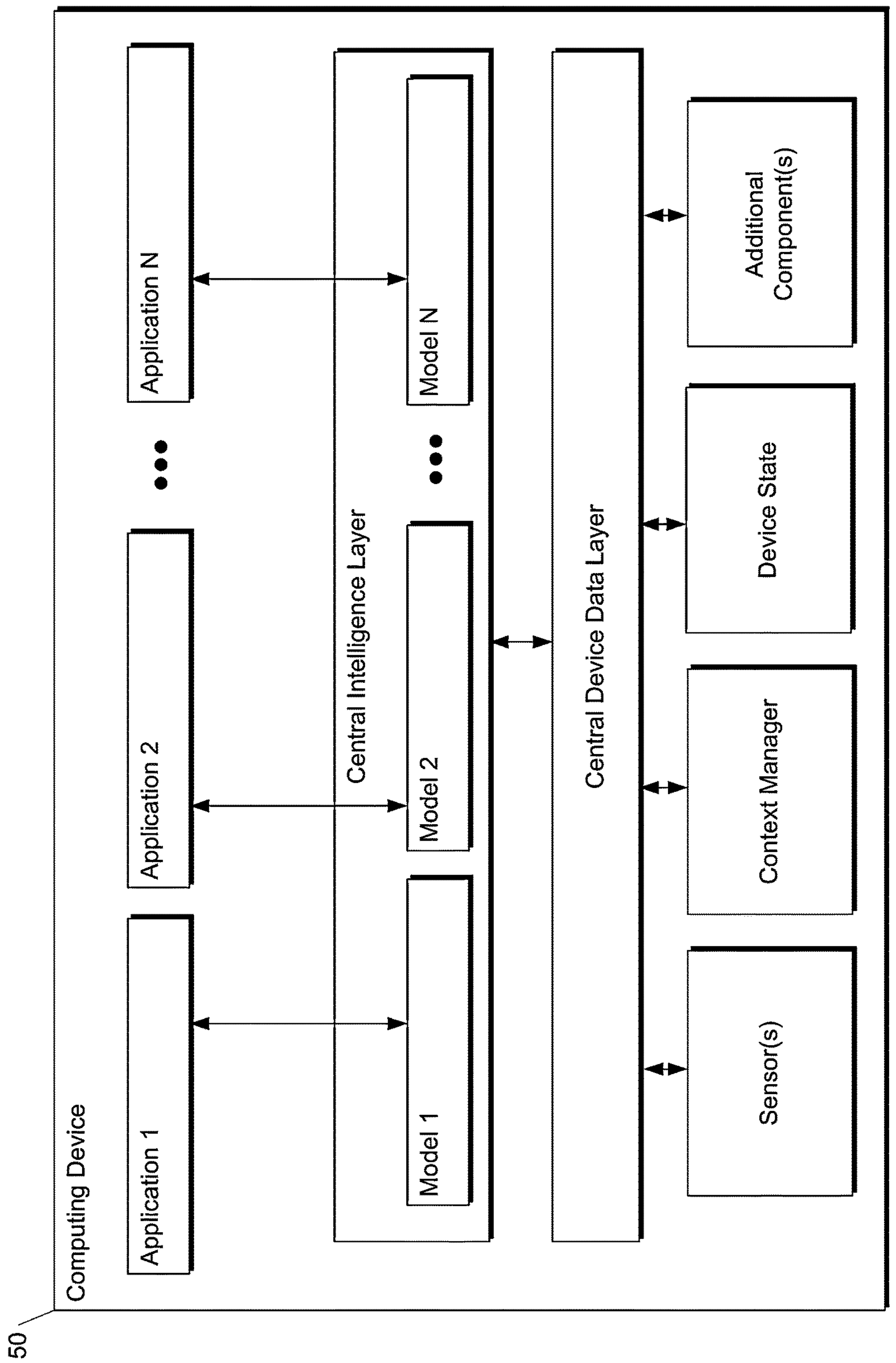
FIG. 1C depicts a block diagram of an example computing device that performs tasks using scale-permuted model(s) according to example embodiments of the present disclosure.

FIG. 1C depicts a block diagram of an example computing device 50 that performs tasks using scale-permuted model(s) according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 2:
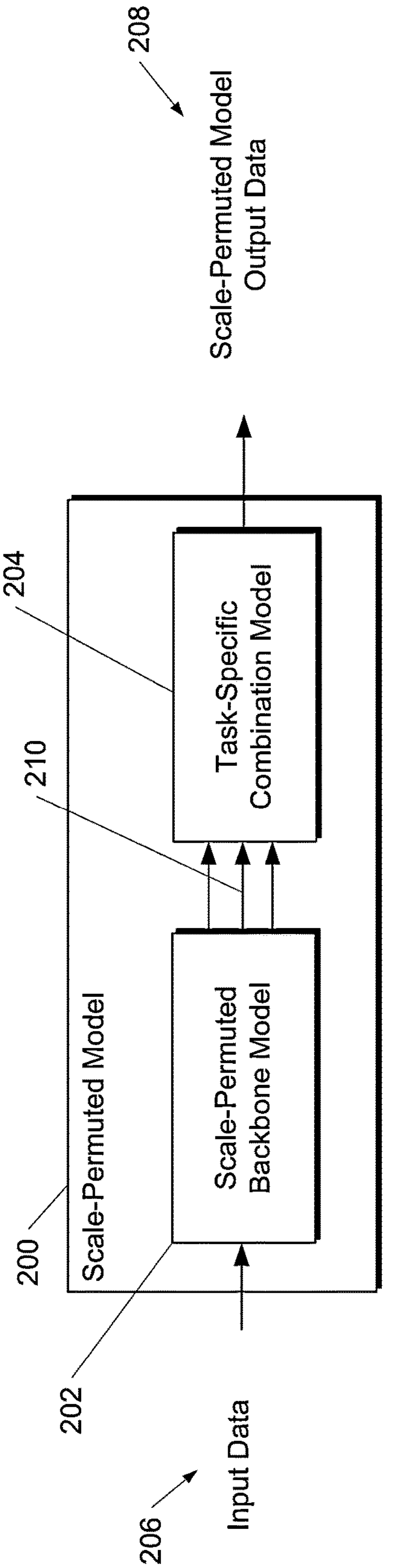
FIG. 2 depicts a block diagram of an example scale-permuted model according to example embodiments of the present disclosure.

FIG. 2 depicts a block diagram of an example scale-permuted model 200 according to example embodiments of the present disclosure. In some implementations, the scale-permuted model 200 is trained to receive a set of input data 206 descriptive of an input tensor, such as an image and, as a result of receipt of the input data 206, provide scale-permuted model output data 208, such as a classification output for the image.

The scale-permuted model 200 can include scale-permuted backbone model 202. The scale-permuted backbone model 202 can include a sequence of feature blocks (e.g., feature maps). In some embodiments, the feature block(s) can include components (e.g., layers) of a feature block such as convolutional layers, activation function layers, etc. For example, the feature block(s) can include convolutional layer(s) that convolve by multiplication, dot product, or other similar combinatorial function, activation functions (e.g., a RELU layer), pooling layers, fully connected layers, normalization layers, etc. As one example, the feature block(s) can include one or more weight layers, an activation function layer, and/or a pooling layer.

Each feature block (e.g., feature map) can have a scale defining a size of the feature block (e.g., a number of nodes and/or a number dimensions, such as in a feature map). For instance, the scale of a feature block can be or can include a width of the feature block and/or a resolution of the feature block. As another example, the scale of a feature block can be a feature level that defines resolution, width, and/or other qualities of the feature block. The width of the feature block can refer to a number of neurons in the feature block. The resolution of the feature block refers to a width and/or height of input data, such as an input image. For instance, the resolution of the feature block can correspond to one or more dimensions of a feature map. Additionally, depth of a network can refer to a number of feature blocks in the network. Generally, increased width allows a feature block to learn fine-grained features having small dimensions. Additionally, increased resolution can provide for improved detail of convolved input data. Multi-scale features that are present in multiple feature blocks having varying scales can serve as strong indications of the features.

According to example aspects of the present disclosure, a scale of each feature block in the sequence can vary non-monotonically throughout the sequence to form a scale-permuted sequence. For example, a scale may increase between a first feature block and a second feature block in the sequence and decrease between the second feature block and a third feature block subsequent to the first feature block and the second feature block in the sequence. As another example, a scale may decrease between a first feature block and a second feature block in the sequence and increase between the second feature block and a third feature block subsequent to the first feature block and the second feature block in the sequence. In this way, the scale-permuted model can provide for improved retention of spatial information as input data passes through the network, such as, for example, compared to scale-decreased networks. For example, feature blocks in scale-permuted backbone model 202 can have improved spatial information retention compared to a feature block having equal depth in a scale-decreasing network. This can allow for networks with greater depth to be utilized while retaining spatial information.

Additionally and/or alternatively, output connections 210 of the scale-permuted backbone model 202 can be combined from any suitable feature block in the scale-permuted backbone model 202 to produce scale-permuted model output data 208. For example, the scale-permuted backbone model 202 can be directly connected (e.g., by feature block outputs 210) to a task-specific combination model 204, such as a classification and/or bounding box regression subnet. The task-specific combination model 204 can combine feature block outputs 210 to produce an overall scale-permuted model output 208, such as a classification output. In some embodiments, the task-specific combination model 204 may include only combinations of feature block outputs 210 (e.g., without any additional neural network layers). For instance, this can provide for model output without requiring a separate decoder or detector network, such as a feature pyramid network. However, in some embodiments, the scale-permuted model can be used as a backbone model with an existing detector model. For example, the task-specific combination model 204 may be replaced with a detector model.

Figure 3:
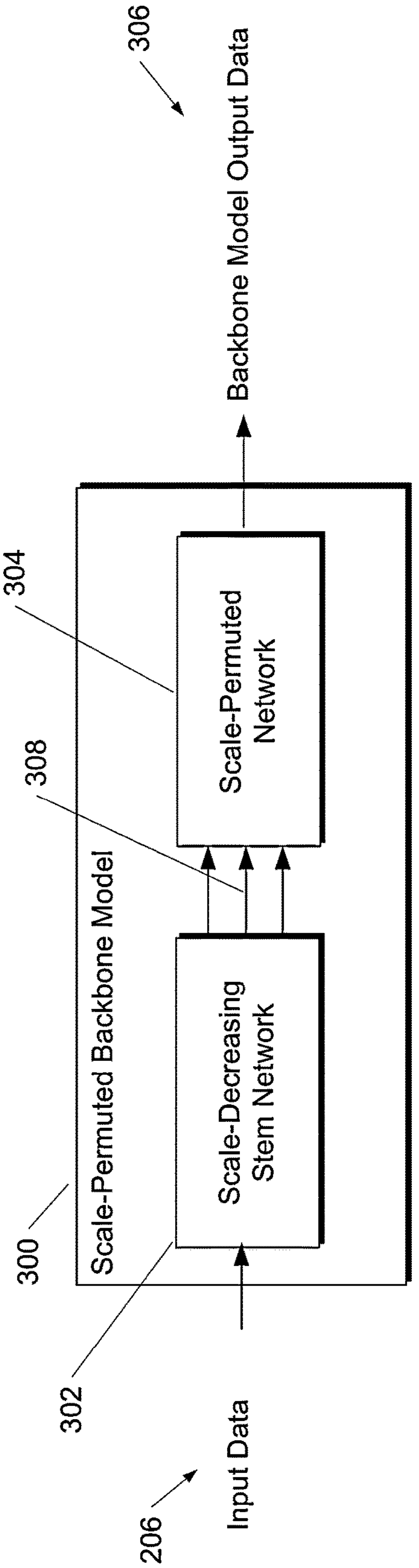
FIG. 3 depicts a block diagram of an example scale-permuted backbone model according to example embodiments of the present disclosure.

FIG. 3 depicts a block diagram of an example scale-permuted backbone model 300 according to example embodiments of the present disclosure. For instance, in some embodiments, the scale-permuted backbone model 300 may be used as scale-permuted backbone model 202 of FIG. 2. The scale-permuted backbone model 300 can include a stem network 302 and a scale-permuted network 304. The stem network 302 and the scale-permuted network 304 can each include a sequence of one or more feature blocks having associated scales (e.g., feature levels). The stem network 302 can be connected between the inputs 206 to scale-permuted backbone model 300 (e.g., input data 206 for an overall scale-permuted model including the scale-permuted backbone model 300) and the scale-permuted network 304. For instance, feature blocks in the stem network 302 can be candidate inputs for the subsequent scale-permuted network 304. For example, the stem network 302 can receive input data 206 (e.g., an image) and provide one or more outputs 308 (e.g., feature maps) as inputs to the scale-permuted network 304. The scale-permuted network 304 can receive the outputs 308 from the stem network 302 and produce a backbone model output data 306, such as one or more feature maps that may be combined to produce an overall model output 306 (e.g., a classification output).

The stem network 302 can be a scale-decreasing stem network. For instance, scale (e.g., feature level) of the stem network 302 can vary monotonically throughout the sequence of the stem network 302. Additionally, scale (e.g., feature level) of the scale-permuted network 304 can vary nonmonotonically throughout the sequence of the scale-permuted network 304. In this way, the stem network 302 can form a scale-decreasing network that provides inputs to some or all blocks of the scale-permuted network 304. In some embodiments, the stem network 302 and the scale-permuted network 304 can be generated from a search space. In some embodiments, the stem network 302 may be omitted such that the entirety of the scale-permuted backbone model 300 has a nonmonotonically varying scale. The blocks of the scale-permuted network 304 may be referred to as intermediate feature blocks and/or output feature blocks. The output feature blocks can include output connections that define the output(s) 306 of the scale-permuted network 304. The intermediate feature blocks can include no output connections.

Figure 4A:
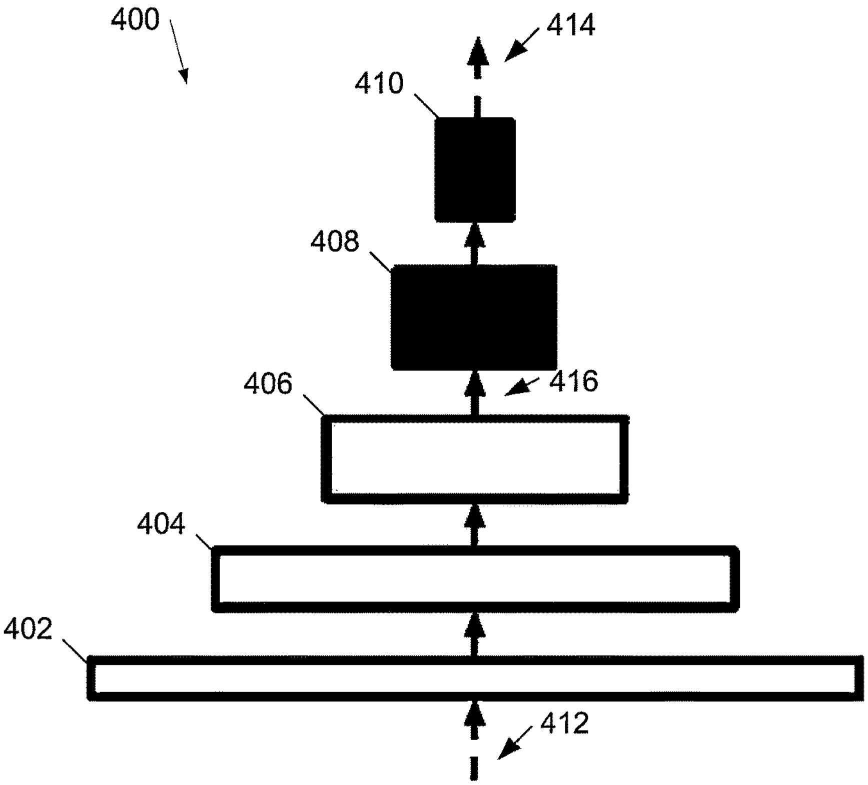
FIG. 4A depicts an example scale-decreasing network according to example embodiments of the present disclosure.
Figure 4B:
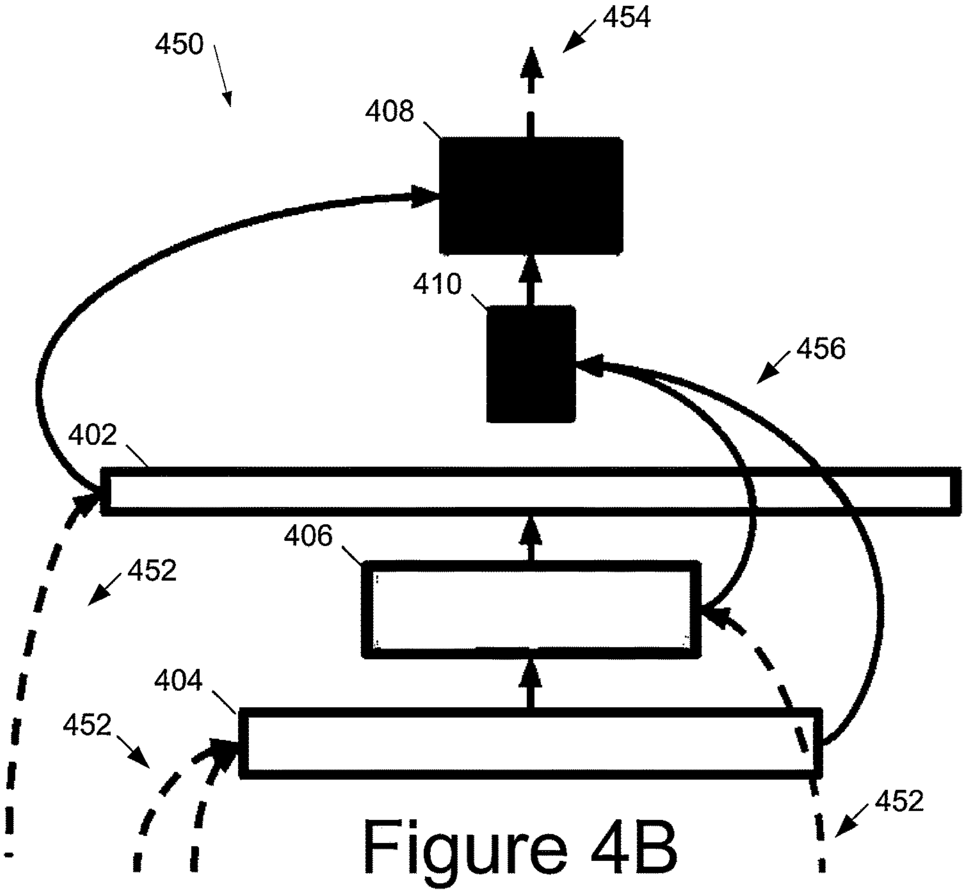
FIG. 4B depicts an example scale-permuted network that may be formed by permuting the scale-decreasing network of FIG. 4A according to example embodiments of the present disclosure.

FIG. 4A depicts an example scale-decreasing network 400 according to example embodiments of the present disclosure. Additionally, FIG. 4B depicts an example scale-permuted network 450 that may be formed by permuting the scale-decreasing network 400 of FIG. 4A according to example embodiments of the present disclosure. As illustrated in FIGS. 4A and 4B, networks 400 and 450 both include feature blocks 402, 404, 406, 408, and 410. The feature blocks 402-410 in scale-decreasing network 400 may be arranged in a scale-decreasing ordering. For instance, scale of the feature blocks 402-410 may progress monotonically throughout the sequence of network 400, such as from feature block 402 to feature block 410. As one example, a scale may be largest at feature block 402 and/or smallest at feature block 410 (relative to feature blocks 402-410, as it should be understood that additional feature blocks may be included prior to block 402 and/or subsequent to feature block 410). This is depicted in FIG. 4A by width of the feature blocks 402-410 for the purposes of illustration. It should be understood that any suitable scale may be used (e.g., feature level) which may or may not directly translate to an actual width of a feature block. Scale-decreasing network 400 may include input connection 412 and/or output connection 414. For instance, input data (e.g., an image) may be received at input connection 412 and sequentially downsampled from feature blocks 402 to 410 which are connected by scale-decreasing intermediate connections 416, then output as a lowest resolution feature map at output connection 414. For instance, the connections 414 and/or 416 may be connected to a feature pyramid network to use the network 400 as a backbone model. As illustrated in FIG. 4A, each feature block 402-410 in the scale-decreasing network 400 may include one input connection from a higher-scale feature block and one output connection to a lower-scale feature block.

As illustrated in FIG. 4B, scale-permuted network 450 can include a permutation of the feature blocks 402-410 such that the scale-permuted network includes a scale-permuted sequence of feature blocks. For instance, the feature blocks 402-410 may be ordered agnostic to a scale of the feature blocks 402-410. Additionally, each feature block 402-410 can include one or more cross-block connections. For instance, input connections 452 can source directly from input data and/or from a stem network. Additionally and/or alternatively, intermediate connections 456 can be formed between any feature block and a prior feature block in the ordering. The output connection 454 may be an overall model output. It should be understood that multiple output connections 454 from any of the feature blocks 402-410 may be combined to produce an overall model output. According to example aspects of the present disclosure, the ordering of feature blocks 402-410 and/or cross-block connections 452, 454, 456 may be learned by a search algorithm such as NAS such that a high-performing model is learned without requiring manual design of the network.

Figure 5:
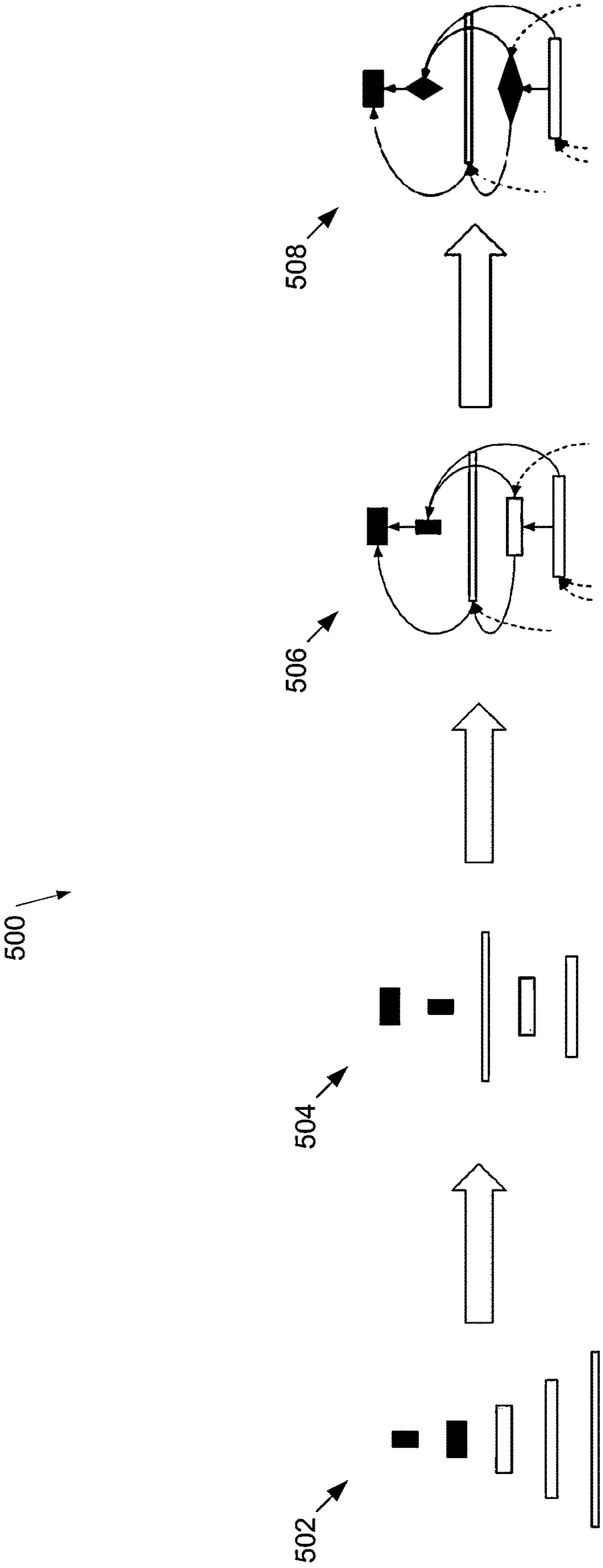
FIG. 5 depicts a process diagram of an example process for learning a scale-permuted model from an existing architecture according to example embodiments of the present disclosure.

FIG. 5 depicts a process diagram 500 of an example process for learning a scale-permuted model from an existing architecture according to example embodiments of the present disclosure. For instance, at 502, a plurality of candidate feature blocks can be defined. As one example, the candidate feature blocks can be defined from an existing scale-decreasing model architecture, such as ResNet. As one example, a search space can be defined including some or all valid permutations of the feature blocks of the existing scale-decreasing model architecture. At 504, a desired permutation can be established. For example, the permutation can be learned by a search algorithm from the search space, such as by NAS. Once the permutation is learned, at 506, a plurality of cross-block connections (e.g., cross-feature connections) can be established between the permuted feature blocks. The cross-block connections can be established between a target block and a parent block, which may be any suitable feature block that is prior to the target block in the permuted ordering. As illustrated in FIG. 5, each block may include two input connections. However, any suitable number of input and/or output connections can be established. In some embodiments, each block may have at least one input connection and at least one output connection. Optionally, at 508, block adjustments can be applied to adjust a type and/or scale of the feature blocks. For instance, at 508, diamond-shaped feature blocks represent a changed block type (e.g., from bottleneck to residual).

Figure 6A:
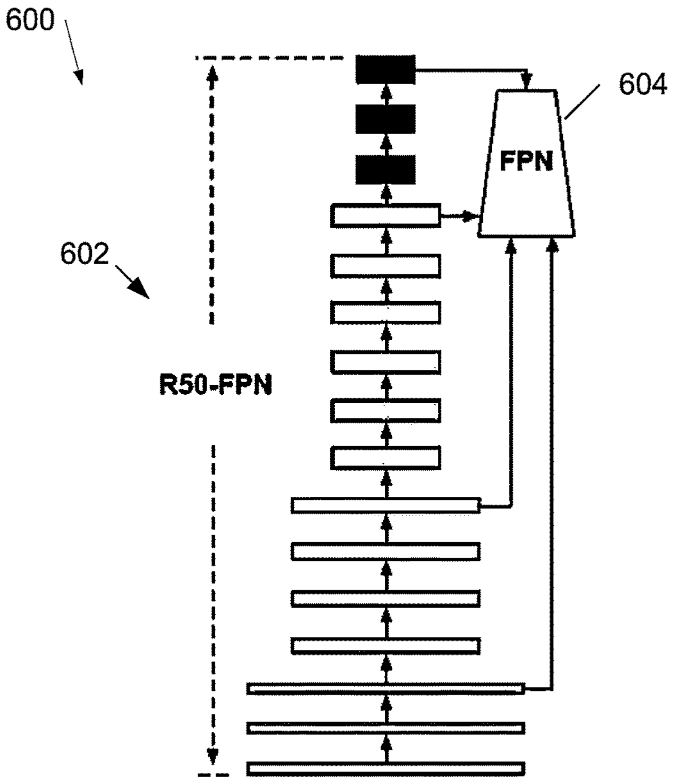
FIG. 6A depicts an example feature pyramid network model including a scale-decreasing backbone model according to example embodiments of the present disclosure.
Figure 6B:
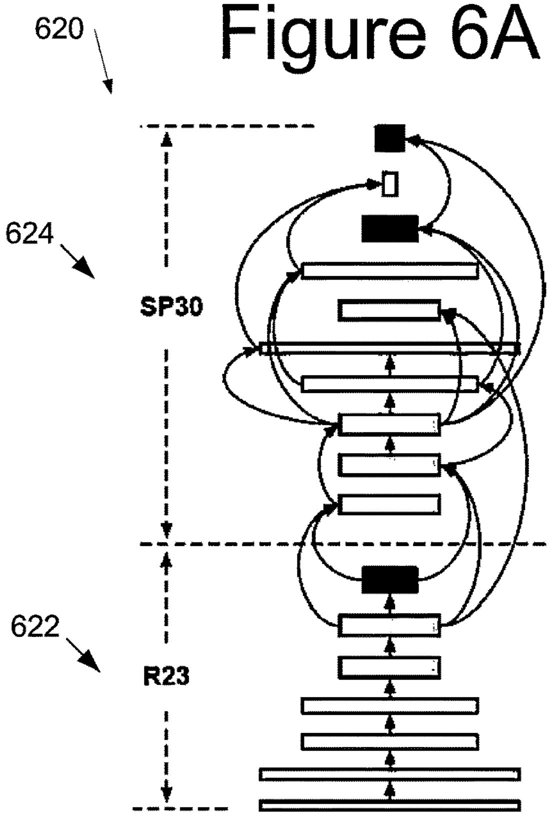
FIGS. 6B, 6C, and 6D depict example scale-permuted networks that may be formed from permutations of the scale-decreasing backbone model of the feature pyramid network model of FIG. 6A according to example embodiments of the present disclosure.
Figure 6C:
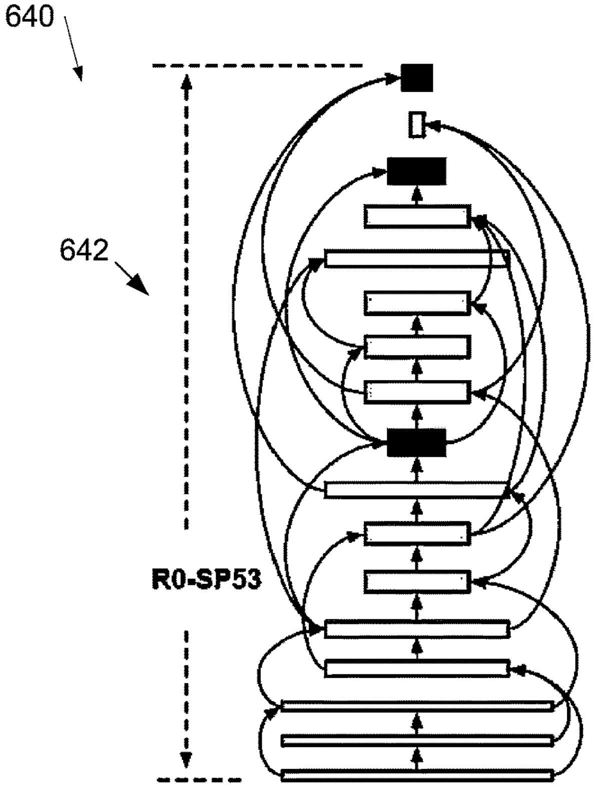
Figure 6D:
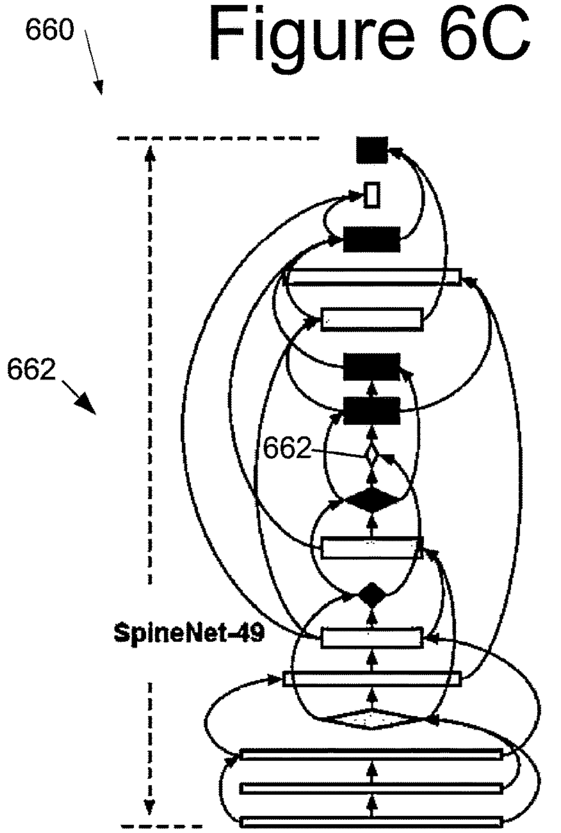

FIG. 6A depicts an example feature pyramid network model 600 including a scale-decreasing backbone model 602 according to example embodiments of the present disclosure. Additionally, FIGS. 6B, 6C, and 6D depict example scale-permuted networks 620, 640, and 660 that may be formed from permutations of the scale-decreasing backbone model 602 of the feature pyramid network model 600 of FIG. 6A according to example embodiments of the present disclosure. As illustrated in FIG. 6A, the feature pyramid network model 600 can include a scale-decreasing backbone model 602 including a plurality of feature blocks in a scale-decreasing ordering. One or more of the feature blocks of the scale-decreasing backbone model 602 may be connected to a feature pyramid network 604. The feature pyramid network 604 can receive outputs (e.g., feature maps) of the feature blocks in scale-decreasing backbone model 602 and produce an output, such as a classification output, based on the feature blocks.

According to example aspects of the present disclosure, a scale-permuted model can be produced based on the feature blocks in scale-decreasing backbone model 602, which can provide improved performance. For instance, FIG. 6B depicts one example scale-permuted model 620 based on the feature blocks of scale-decreasing backbone model 602. As illustrated in FIG. 6B, the scale-permuted model 620 can include the same feature blocks as the scale-decreasing backbone model 602 in a permuted ordering. Additionally, new cross-scale connections can be formed between the permuted feature blocks. For instance, according to example aspects of the present disclosure, the scale-permuted model 620 can be learned from a search algorithm based on a search space defined to include some or all valid permutations of the feature blocks in scale-decreasing backbone model 602.

Scale-permuted model 620 includes a stem network 622 and a scale-permuted network 624. The stem network 622 and the scale-permuted network 624 can each include a sequence of one or more feature blocks having associated scales (e.g., feature levels). The stem network 622 can be connected between the inputs to scale-permuted model 602 and the scale-permuted network 624. For instance, feature blocks in the stem network 622 can be candidate inputs for the subsequent scale-permuted network 624. For example, the stem network 622 can receive input data 206 (e.g., an image) and provide one or more outputs 308 (e.g., feature maps) as inputs to the scale-permuted network 624. The scale-permuted network 624 can receive the outputs 308 from the stem network 622 and produce a backbone model output data 306, such as one or more feature maps that may be combined to produce an overall model output 306 (e.g., a classification output).

The stem network 622 can be a scale-decreasing stem network. For instance, scale (e.g., feature level) of the stem network 622 can vary monotonically throughout the sequence of the stem network 622. Additionally, scale (e.g., feature level) of the scale-permuted network 624 can vary nonmonotonically throughout the sequence of the scale-permuted network 624. In this way, the stem network 622 can form a scale-decreasing network that provides inputs to some or all blocks of the scale-permuted network 624. The blocks of the scale-permuted network 624 may be referred to as intermediate feature blocks and/or output feature blocks. The output feature blocks can include output connections that define the output(s) of the scale-permuted network 624. The intermediate feature blocks can include no output connections. As illustrated in FIG. 6B, the feature blocks of the stem network 622 and the scale-permuted network 624 can collectively be identical to the feature blocks of the scale-decreasing backbone model 602.

FIG. 6C depicts another example scale-permuted model 640 based on the feature blocks of scale-decreasing backbone model 602. As illustrated in FIG. 6C, the scale-permuted model 640 can include an ordered plurality of feature blocks 642 including the same feature blocks as the scale-decreasing backbone model 602 in a permuted ordering. Additionally, new cross-scale connections can be formed between the permuted feature blocks 642. For instance, according to example aspects of the present disclosure, the scale-permuted model 640 can be learned from a search algorithm based on a search space defined to include some or all valid permutations of the feature blocks in scale-decreasing backbone model 602.

FIG. 6D depicts another example scale-permuted model 660 based on the feature blocks of scale-decreasing backbone model 602. As illustrated in FIG. 6D, the scale-permuted model 660 can include an ordered plurality of feature blocks 662 including the same feature blocks as the scale-decreasing backbone model 602 in a permuted ordering. Additionally, new cross-scale connections can be formed between the permuted feature blocks 662. For instance, according to example aspects of the present disclosure, the scale-permuted model 660 can be learned from a search algorithm based on a search space defined to include some or all valid permutations of the feature blocks in scale-decreasing backbone model 602. The scale-permuted model 660 includes one or more adjusted blocks 662 (illustrated by diamond-shaped blocks). The adjusted blocks 662 can have one or more of type and/or scale adjusted during learning of the scale-permuted model 660. For example, a search algorithm can apply block adjustments to blocks 662 to improve performance of scale-permuted model 660.

Figure 7:
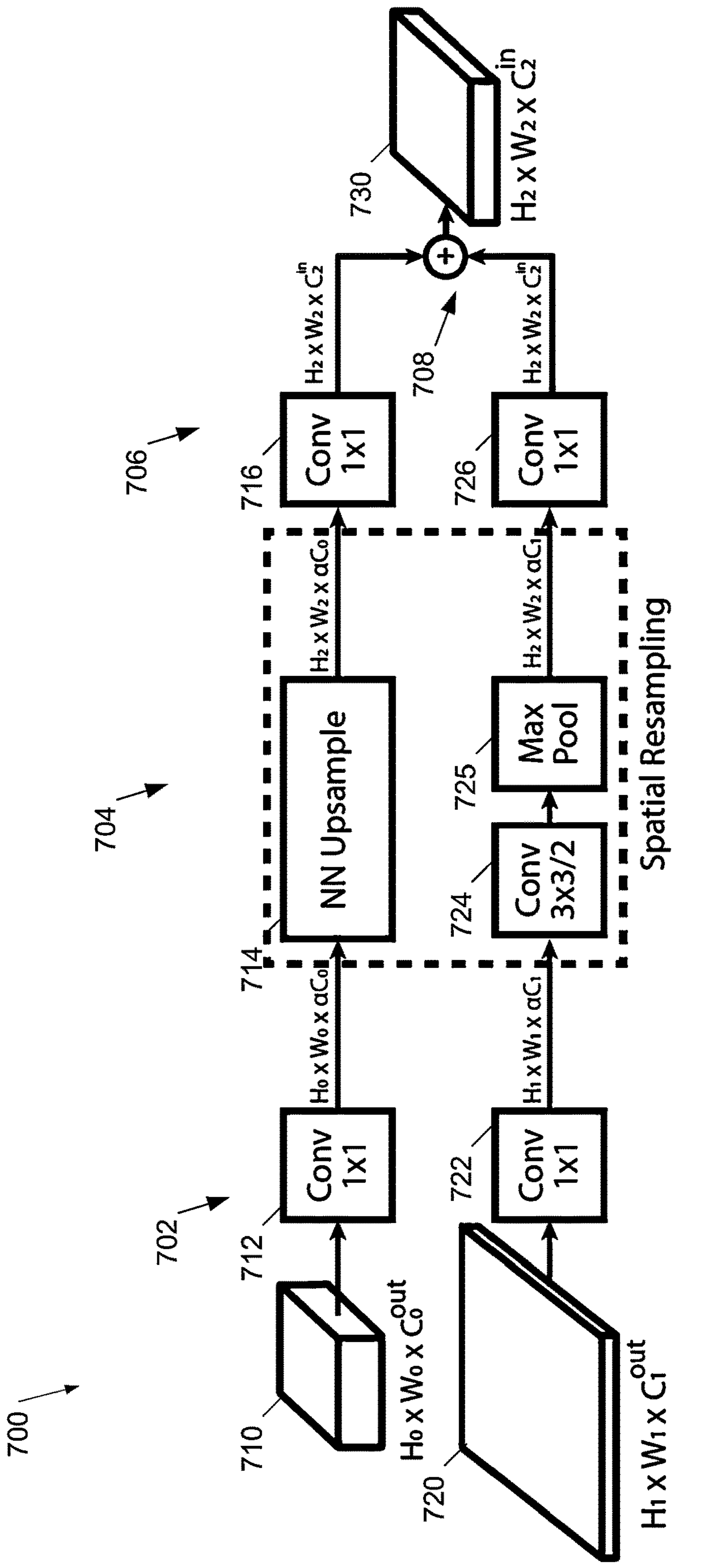
FIG. 7 depicts example resampling cross-block connections according to example embodiments of the present disclosure.

FIG. 7 depicts example resampling cross-block connections 700 according to example embodiments of the present disclosure. For instance, a cross-block connection can be or can include a resampling connection. The resampling connection can resample output from a parent block to match a scale (e.g., resolution and/or feature dimension) of the target block. As one example, resampling may be necessary to connect blocks having different feature levels. FIG. 7 depicts a first resampling connection from parent block 710 to target block 730. Parent block 710 can have a lesser scale than target block 730. Thus, a resampling connection between parent block 710 and target block 730 can upsample the output from parent block 710. Additionally and/or alternatively, FIG. 7 depicts a second resampling connection from parent block 720 to target block 730. Parent block 720 can have a larger scale than target block 730. Thus, a resampling connection between parent block 720 and target block 730 can downsample the output from parent block 720.

For the example depicted in FIG. 7, let C be a feature dimension, such as a feature dimension of a convolution (e.g., a 3×3 convolution) in a residual and/or bottleneck block. Let $C^{in}$ and $C^{out}$ be input dimension and output dimension of a block, respectively. Additionally, let H and W be height and width (e.g., dimensions) of a feature map for a feature block. In some embodiments, such as for a bottleneck block, $C^{in}$ and/or $C^{out}$ can be a multiple of C, such as 4C. Additionally and/or alternatively, such as for a residual block, $C^{in}$ and/or $C^{out}$ can be equivalent to C. In some embodiments, a scaling factor $\alpha$ can be introduced. The scaling factor can be used to reduce computational cost of resampling. For instance, the output dimension of a parent feature block (e.g., 710 and/or 720) can be adjusted to $\alpha C$. In some embodiments, a can have a value between 0 and 1, such as 0.5. In both upsampling and downsampling connections, the scaling factor can be applied at scaling stage 702 by a 1×1 convolution 712 and/or 722, respectively.

The resampling connection can include (e.g., subsequent to scaling the output of a parent block by the scaling factor) a resampling stage 704 that is configured to upsample and/or downsample the output of the parent block (e.g., 710, 720).

As one example, upsampling the output of the parent block can include feeding the output of the parent block to an upsampling model 714, such as a nearest-neighbor interpolation model. The nearest-neighbor interpolation model can produce an output having a higher feature level than the output of the parent block 710 and that approximates a scaled-up version of the output of the parent block 710. As another example, downsampling the output of the parent block can be performed by convolving the output of the parent block, such as by a stride-2 3×3 convolution 724. In some embodiments, a stride-2 max pooling 725 can additionally be performed on the convolved output. After upsampling and/or downsampling, a 1×1 convolution 716, 726 may be applied at scaling stage 706 to the output to match the output feature dimension to the input feature dimension of the target block 730. For example, the output feature dimension may be converted from $\alpha C$ to $C^{in}$ by the 1×1 convolution 716, 726. Multiple inputs to a target block 730 (e.g., one having a lower parent block feature dimension and/or one having a higher parent block feature dimension) may be merged at 708, such as by elemental addition, then used as input to the target block 730.

Figure 8:
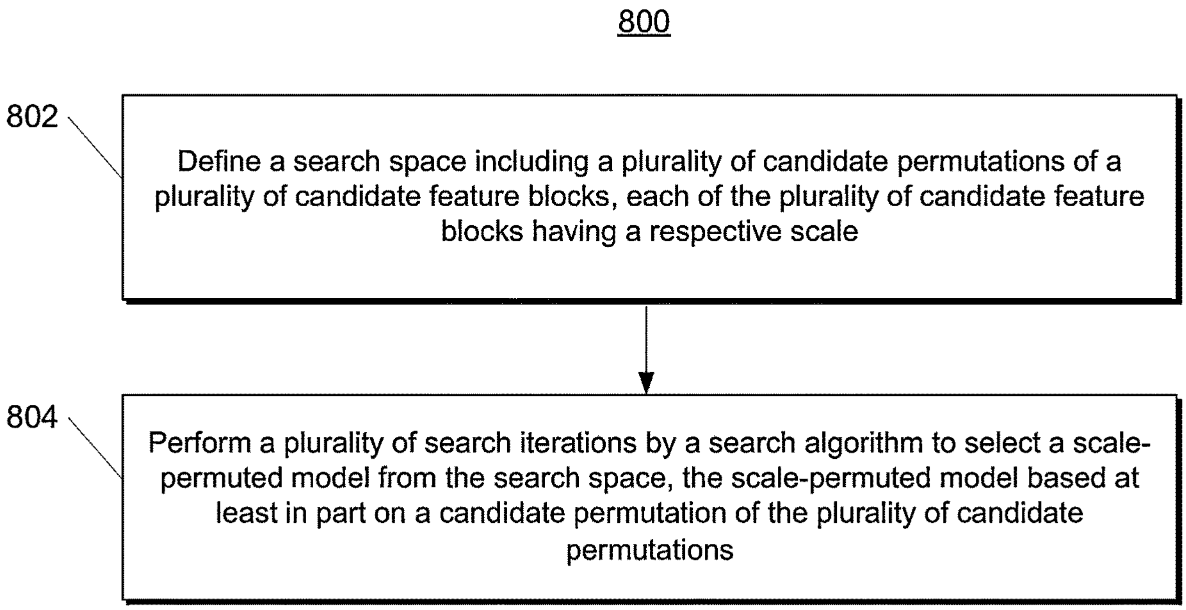
FIG. 8 depicts a flow chart diagram of an example method of generating a scale-permuted model according to example embodiments of the present disclosure.

FIG. 8 depicts a flow chart diagram of an example method 800 of generating a scale-permuted model according to example embodiments of the present disclosure. Scale-permuted models generated according to method 800 can have improved accuracy and/or reduced evaluation computational requirements according to example aspects of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

The method 800 can include, at 802, defining (e.g., by a computing system including one or more computing devices) a search space including a plurality of candidate permutations of a plurality of candidate feature blocks. The search space can include a plurality of valid permutations of the plurality of candidate feature blocks. For example, an ordering of the candidate feature blocks can be permuted from an original ordering of the feature blocks. Each of the plurality of candidate feature blocks can have a respective scale. For instance, in some embodiments, the scale can be a feature level of a plurality of candidate feature levels. In some embodiments, the plurality of candidate feature blocks may be defined based at least in part on an existing model architecture. In some embodiments, the existing model architecture can be a ResNet model architecture.

The method 800 can include, at 804, performing (e.g., by the computing system) a plurality of search iterations by a search algorithm to select a scale-permuted model from the search space. The scale-permuted model can be based at least in part on a candidate permutation of the plurality of candidate permutations. For example, a computing system can search the search space by the search algorithm (e.g., NAS) to iteratively define and/or evaluate a plurality of candidate models based on the plurality of candidate permutations. The computing system can then select a scale-permuted model based on (e.g., estimated) evaluations of the candidate models such that the search algorithm can identify a high-performance (e.g., optimal) machine-learned model. The model may be selected based on performance at a specified task, such as optimized with respect to a reward.

For instance, in some embodiments, performing each of the plurality of search iterations can include determining (e.g., by the computing system) a candidate scale-permuted model from the search space. The candidate scale-permuted model can include a plurality of permuted feature blocks based at least in part on the candidate permutation. For instance, in some embodiments, the plurality of permuted feature blocks can be obtained based at least in part on a search algorithm. The search algorithm can be configured to search the search space to identify the plurality of permuted feature blocks with respect to a search strategy. For example, in some embodiments, the search algorithm can be or can include Neural Architecture Search.

In some embodiments, determining the candidate scale-permuted model from the search space can include determining (e.g., by the computing system) the plurality of permuted feature blocks based at least in part on the candidate permutation. For instance, the search space can be searched (e.g., according to a search algorithm, such as NAS) to identify a desired permutation of the plurality of candidate feature blocks. The permuted feature blocks can then be formed based at least in part on the permutation. For instance, a computing system operating according to a search algorithm can identify a permuted ordering of the plurality of permuted feature blocks that differs from an initial ordering of the plurality of candidate feature blocks. In some embodiments, the plurality of candidate feature blocks may otherwise be identical to the plurality of permuted feature blocks.

Additionally and/or alternatively, determining the candidate scale-permuted model from the search space can include determining (e.g., by the computing system) one or more cross-block connections between the plurality of permuted feature blocks. For instance, in some embodiments, the search space can define a number of connections to be established for each of the permuted feature blocks, such as a minimum number of connections and/or a maximum number of connections. The search space can be searched (e.g., according to a search algorithm, such as NAS, such as subsequent to identifying a permuted ordering of permuted feature blocks, to identify a desired set of cross-block connections. In some embodiments, the cross-block connections may be resampling connections that can upsample and/or downsample inputs and/or outputs of the connections. In some embodiments, the one or more cross-block connections can include at least one cross-scale connection configured to connect a parent block of the plurality of permuted feature blocks, the parent block having a first scale, to a target block of the plurality of permuted feature blocks, the target block having a second scale. In some cases, the second scale can be greater than the first scale.

Additionally and/or alternatively, in some embodiments, determining the candidate scale-permuted model from the search space can include applying, by the computing system, one or more block adjustments to the plurality of permuted feature blocks. In some embodiments, the block adjustments may be included in the search space. For instance, the block adjustments can adjust characteristics of the permuted feature blocks (e.g., within specified limits), such as type and/or scale of the permuted feature blocks, to improve performance of a scale-permuted model including the plurality of permuted feature blocks. In some embodiments, the one or more block adjustments can include at least one scale adjustment. As one example, the scale adjustment can adjust a feature level of a permuted feature block, such as within the range [−1, 0, +1, +2]. In some embodiments, the one or more block adjustments can include at least one type adjustment. As one example, the type adjustment can adjust a type of a permuted feature block, such as by selecting a type for the permuted feature block from a plurality of candidate types. As one example, the type can be selected from a residual type and/or a bottleneck type.

Additionally and/or alternatively, in some embodiments, performing each of the plurality of search iterations can include evaluating (e.g., by the computing system) the candidate scale-permuted model based at least in part on a performance estimation strategy to obtain an evaluation of the candidate scale-permuted model. As one example, each candidate scale-permuted model can be evaluated with regard to a performance estimation strategy, such as rewards based on performance at a specified task. The scale-permuted model can be selected based at least in part on the evaluations of the candidate scale-permuted model for each of the plurality of search iterations. For example, the scale-permuted model can be selected as the highest-performing model of the candidate scale-permuted models, such as the model with the greatest accumulated reward.

Figure 9:
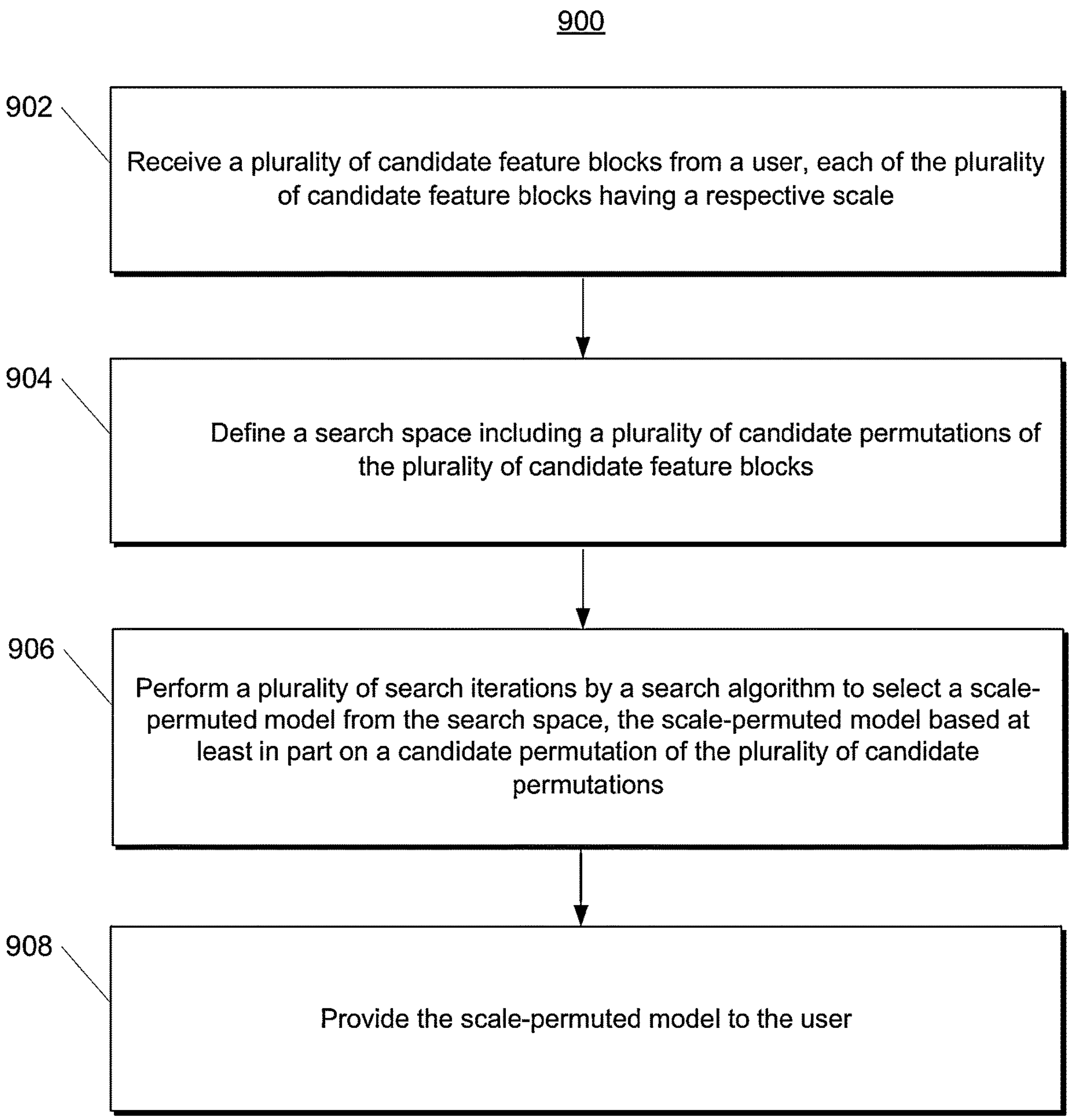
FIG. 9 depicts a flow chart diagram of an example method of generating a scale-permuted model according to example embodiments of the present disclosure.

FIG. 9 depicts a flow chart diagram of an example method 900 of generating a scale-permuted model according to example embodiments of the present disclosure. Scale-permuted models generated according to method 900 can have improved accuracy and/or reduced evaluation computational requirements according to example aspects of the present disclosure. Although FIG. 9 depicts steps performed in a particular order for purposes of illustration and discussion, the methods of the present disclosure are not limited to the particularly illustrated order or arrangement. The various steps of the method 900 can be omitted, rearranged, combined, and/or adapted in various ways without deviating from the scope of the present disclosure.

The method 900 can include, at 902, receiving (e.g., at a computing system including one or more computing devices) a plurality of candidate feature blocks from a user. As one example, a user can communicate with a web service (e.g., hosted at a server computing system) that is configured to generate a scale-permuted model in response to a user query for a scale-permuted model (e.g., including specifications of the scale-permuted model, task selection, etc.). Each of the plurality of candidate feature blocks can have a respective scale. In some embodiments, the plurality of candidate feature blocks may be defined based at least in part on an existing model architecture. In some embodiments, the existing model architecture can be a ResNet model architecture. For example, the existing model architecture can define a plurality of candidate feature blocks including scales (e.g., feature levels) of the feature blocks.

The method 900 can include, at 904, defining (e.g., by the computing system) a search space including a plurality of candidate permutations of the plurality of candidate feature blocks. The search space can include a plurality of valid permutations of the plurality of candidate feature blocks. For example, an ordering of the candidate feature blocks can be permuted from an original ordering of the feature blocks.

The method 900 can include, at 906, performing (e.g., by the computing system) a plurality of search iterations by a search algorithm to select a scale-permuted model from the search space. The scale-permuted model can be based at least in part on a candidate permutation of the plurality of candidate permutations. For example, a computing system can search the search space by the search algorithm (e.g., NAS) to iteratively define and/or evaluate a plurality of candidate models based on the plurality of candidate permutations. The computing system can then select a scale-permuted model based on (e.g., estimated) evaluations of the candidate models such that the search algorithm can identify a high-performance (e.g., optimal) machine-learned model. The model may be selected based on performance at a specified task, such as optimized with respect to a reward.

For instance, in some embodiments, performing each of the plurality of search iterations can include determining (e.g., by the computing system) a candidate scale-permuted model from the search space. The candidate scale-permuted model can include a plurality of permuted feature blocks based at least in part on the candidate permutation. For instance, in some embodiments, the plurality of permuted feature blocks can be obtained based at least in part on a search algorithm. The search algorithm can be configured to search the search space to identify the plurality of permuted feature blocks with respect to a search strategy. For example, in some embodiments, the search algorithm can be or can include Neural Architecture Search.

In some embodiments, determining the candidate scale-permuted model from the search space can include determining (e.g., by the computing system) the plurality of permuted feature blocks based at least in part on the candidate permutation. For instance, the search space can be searched (e.g., according to a search algorithm, such as NAS) to identify a desired permutation of the plurality of candidate feature blocks. The permuted feature blocks can then be formed based at least in part on the permutation. For instance, a computing system operating according to a search algorithm can identify a permuted ordering of the plurality of permuted feature blocks that differs from an initial ordering of the plurality of candidate feature blocks. In some embodiments, the plurality of candidate feature blocks may otherwise be identical to the plurality of permuted feature blocks.

Additionally and/or alternatively, determining the candidate scale-permuted model from the search space can include determining (e.g., by the computing system) one or more cross-block connections between the plurality of permuted feature blocks. For instance, in some embodiments, the search space can define a number of connections to be established for each of the permuted feature blocks, such as a minimum number of connections and/or a maximum number of connections. The search space can be searched (e.g., according to a search algorithm, such as NAS, such as subsequent to identifying a permuted ordering of permuted feature blocks, to identify a desired set of cross-block connections. In some embodiments, the cross-block connections may be resampling connections that can upsample and/or downsample inputs and/or outputs of the connections. In some embodiments, the one or more cross-block connections can include at least one cross-scale connection configured to connect a parent block of the plurality of permuted feature blocks, the parent block having a first scale, to a target block of the plurality of permuted feature blocks, the target block having a second scale. In some cases, the second scale can be greater than the first scale.

Additionally and/or alternatively, in some embodiments, determining the candidate scale-permuted model from the search space can include applying, by the computing system, one or more block adjustments to the plurality of permuted feature blocks. In some embodiments, the block adjustments may be included in the search space. For instance, the block adjustments can adjust characteristics of the permuted feature blocks (e.g., within specified limits), such as type and/or scale of the permuted feature blocks, to improve performance of a scale-permuted model including the plurality of permuted feature blocks. In some embodiments, the one or more block adjustments can include at least one scale adjustment. As one example, the scale adjustment can adjust a feature level of a permuted feature block, such as within the range [−1, 0, +1, +2]. In some embodiments, the one or more block adjustments can include at least one type adjustment. As one example, the type adjustment can adjust a type of a permuted feature block, such as by selecting a type for the permuted feature block from a plurality of candidate types. As one example, the type can be selected from a residual type and/or a bottleneck type.

Additionally and/or alternatively, in some embodiments, performing each of the plurality of search iterations can include evaluating (e.g., by the computing system) the candidate scale-permuted model based at least in part on a performance estimation strategy to obtain an evaluation of the candidate scale-permuted model. As one example, each candidate scale-permuted model can be evaluated with regard to a performance estimation strategy, such as rewards based on performance at a specified task. The scale-permuted model can be selected based at least in part on the evaluations of the candidate scale-permuted model for each of the plurality of search iterations. For example, the scale-permuted model can be selected as the highest-performing model of the candidate scale-permuted models, such as the model with the greatest accumulated reward.

The method 900 can include, at 908, providing (e.g., by the computing system) the scale-permuted model to the user. For example, once the scale-permuted model is identified by the search algorithm, the model may be communicated (e.g., over one or more networks) to a computing device of the user. For example, the model may be communicated from a server computing system hosting a scale-permuted generation model web service to a user computing device, such as a personal computer, etc.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:

a machine-learned scale-permuted model, the machine-learned scale-permuted model comprising:

a scale-permuted network generated through permutation of a plurality of feature blocks, the scale-permuted network comprising the plurality of feature blocks arranged in a scale-permuted sequence such that a resolution of the plurality of feature blocks varies nonmonotonically throughout the scale-permuted sequence;

wherein the scale-permuted network comprises a sequence of blocks comprising:

a first feature block in the sequence having a first resolution, a second feature block next in the sequence after the first feature block, the second feature block having a second resolution higher than the first resolution, and a third feature block next in the sequence after the second feature block, the third feature block having a third resolution lower than the second resolution and different from the first resolution;

one or more processors; and one or more memory devices storing computer-readable instructions that, when implemented, cause the one or more processors to perform operations, the operations comprising:

obtaining input data, the input data comprising an input tensor;

providing the input data to the machine-learned scale-permuted model; and receiving, as output from the machine-learned scale-permuted model, output data.

2. The computing system of claim 1, wherein the machine-learned scale-permuted model comprises one or more cross-scale connections configured to connect a parent block of the plurality of feature blocks, the parent block having a fourth resolution, to a target block of the plurality of feature blocks, the target block having a fifth resolution different from the fourth resolution.

3. The computing system of claim 2, wherein the cross-scale connection comprises a scaling factor.

4. The computing system of claim 1, wherein the machine-learned scale-permuted model comprises a stem network, the stem network comprising a plurality of feature blocks arranged in a scale-decreasing sequence.

5. The computing system of claim 1, wherein the machine-learned scale-permuted model comprises a task-specific combination model.

6. The computing system of claim 1, wherein the plurality of feature blocks comprises one or more weight layers, at least one activation function layer, and at least one pooling layer.

7. The computing system of claim 1, wherein the scale-permuted model comprises a fourth feature block ordered subsequent to the third feature block, a resolution of the fourth feature block being higher than the third resolution of the third feature block.

8. The computing system of claim 1, wherein the scale-permuted model is based at least in part on a candidate permutation of a plurality of candidate permutations of a plurality of candidate feature blocks, each of the plurality of candidate feature blocks having a respective resolution.

9. The computing system of claim 8, wherein the candidate permutation was selected by performing a plurality of search iterations by a search algorithm to select a scale-permuted model from the search space.

10. One or more memory devices storing:

a machine-learned scale-permuted model, the machine-learned scale-permuted model comprising:

a scale-permuted network generated through permutation of a plurality of feature blocks, the scale-permuted network comprising the plurality of feature blocks arranged in a scale-permuted sequence such that a resolution of the plurality of feature blocks varies nonmonotonically throughout the scale-permuted sequence;

wherein the scale-permuted network comprises a sequence of blocks comprising:

a first feature block in the sequence having a first resolution, a second feature block next in the sequence after the first feature block, the second feature block having a second resolution higher than the first resolution, and a third feature block next in the sequence after the second feature block, the third feature block having a third resolution lower than the second resolution and different from the first resolution;

computer-readable instructions that, when implemented, cause one or more processors to perform operations, the operations comprising:

obtaining input data, the input data comprising an input tensor;

providing the input data to the machine-learned scale-permuted model; and receiving, as output from the machine-learned scale-permuted model, output data.

11. The one or more memory devices of claim 10, wherein the machine-learned scale-permuted model comprises one or more cross-scale connections configured to connect a parent block of the plurality of feature blocks, the parent block having a fourth resolution, to a target block of the plurality of feature blocks, the target block having a fifth resolution different from the fourth resolution.

12. The one or more memory devices of claim 11, wherein the cross-scale connection comprises a scaling factor.

13. The one or more memory devices of claim 10, wherein the machine-learned scale-permuted model comprises a stem network, the stem network comprising a plurality of feature blocks arranged in a scale-decreasing sequence.

14. The one or more memory devices of claim 10, wherein the machine-learned scale-permuted model comprises a task-specific combination model.

15. The one or more memory devices of claim 10, wherein the plurality of feature blocks comprises one or more weight layers, at least one activation function layer, and at least one pooling layer.

16. The one or more memory devices of claim 10, wherein the scale-permuted model comprises a fourth feature block ordered subsequent to the third feature block, a resolution of the fourth feature block being higher than the third resolution of the third feature block.

17. A computer-implemented method, comprising:

obtaining input data, the input data comprising an input tensor;

providing the input data to a machine-learned scale-permuted model, the machine-learned scale-permuted model comprising:

a scale-permuted network generated through permutation of a plurality of feature blocks, the scale-permuted network comprising the plurality of feature blocks arranged in a scale-permuted sequence such that a resolution of the plurality of feature blocks varies nonmonotonically throughout the scale-permuted sequence;

wherein the scale-permuted network comprises a sequence of blocks comprising:

a first feature block in the sequence having a first resolution, a second feature block next in the sequence after the first feature block, the second feature block having a second resolution higher than the first resolution, and a third feature block next in the sequence after the second feature block, the third feature block having a third resolution lower than the second resolution and different from the first resolution; and receiving, as output from the machine-learned scale-permuted model, output data.

18. The computer-implemented method of claim 17, wherein the machine-learned scale-permuted model comprises one or more cross-scale connections configured to connect a parent block of the plurality of feature blocks, the parent block having a fourth resolution, to a target block of the plurality of feature blocks, the target block having a fifth resolution different from the fourth resolution.

19. The computer-implemented method of claim 18, wherein the cross-scale connection comprises a scaling factor.

20. The computer-implemented method of claim 17, wherein the machine-learned scale-permuted model comprises a stem network, the stem network comprising a plurality of feature blocks arranged in a scale-decreasing sequence.

* * * * *